United States Patent
Teyeb et al.

(10) Patent No.: US 11,418,952 B2
(45) Date of Patent: Aug. 16, 2022

(54) OPTIMIZED PDCP HANDLING IN INTEGRATED ACCESS BACKHAUL (IAB) NETWORKS

(71) Applicant: Telefonaktiebolaget LM Ericsson (publ), Stockholm (SE)

(72) Inventors: Oumer Teyeb, Solna (SE); Per-Erik Eriksson, Stockholm (SE); Gunnar Mildh, Sollentuna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 414 days.

(21) Appl. No.: 16/319,965

(22) PCT Filed: Dec. 12, 2018

(86) PCT No.: PCT/SE2018/051303
§ 371 (c)(1),
(2) Date: Jan. 23, 2019

(87) PCT Pub. No.: WO2019/139518
PCT Pub. Date: Jul. 18, 2019

(65) Prior Publication Data
US 2020/0084618 A1    Mar. 12, 2020

Related U.S. Application Data

(60) Provisional application No. 62/616,296, filed on Jan. 11, 2018.

(51) Int. Cl.
*H04W 12/00*    (2021.01)
*H04W 80/08*    (2009.01)
(Continued)

(52) U.S. Cl.
CPC ....... *H04W 12/037* (2021.01); *H04W 12/106* (2021.01); *H04W 76/11* (2018.02);
(Continued)

(58) Field of Classification Search
CPC ... H04W 12/037; H04W 76/12; H04W 76/11; H04W 12/106; H04W 80/02; H04W 80/08
See application file for complete search history.

(56) References Cited

U.S. PATENT DOCUMENTS 8,320,561 B2 * 11/2012 Barany ................. H04L 63/06
380/43
9,179,009 B1 * 11/2015 Subramanian ........ H04M 15/66
(Continued)

FOREIGN PATENT DOCUMENTS

EP    2528369 A1    11/2012

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.1.0, Mar. 2016, pp. 1-551.
(Continued)

*Primary Examiner* — Huy D Vu
*Assistant Examiner* — Bailor C. Hsu
(74) *Attorney, Agent, or Firm* — Christopher & Weisberg, P. A.

(57) ABSTRACT

Exemplary embodiments include methods and/or procedures for Packet Data Convergence Protocol, PDCP, processing performed in a network node of a multi-hop, integrated access backhaul, IAB, communication network. Exemplary methods can include receiving (610) a configuration that includes a first characteristic associated with at least one of the following: the node and data packets received by the network node. Exemplary methods can also include receiving (620) a data packet having one or more packet characteristics, and determining (630) if there is a match between the one or more packet characteristics and
(Continued)

the first characteristic. Exemplary methods can also include enabling or disabling (640) a first PDCP processing operation on the data packet based on the result of the determination. Other exemplary embodiments include network nodes configured and/or arranged to perform operations corresponding to the exemplary methods and/or procedures.

30 Claims, 11 Drawing Sheets

(51) Int. Cl.
*H04W 12/10* (2021.01)
*H04W 76/12* (2018.01)
*H04W 76/11* (2018.01)
*H04W 80/02* (2009.01)
*H04W 12/037* (2021.01)
*H04W 12/106* (2021.01)

(52) U.S. Cl.
CPC ........... *H04W 76/12* (2018.02); *H04W 80/02* (2013.01); *H04W 80/08* (2013.01)

(56) References Cited

U.S. PATENT DOCUMENTS

| | | | | |
|---|---|---|---|---|
| 2009/0059915 | A1* | 3/2009 | Baker | H04L 47/10 370/389 |
| 2012/0182929 | A1* | 7/2012 | Chen | H04L 63/1458 370/315 |
| 2013/0290701 | A1* | 10/2013 | Takenaka | H04W 12/033 713/153 |
| 2014/0079220 | A1* | 3/2014 | Wei | H04L 9/0891 380/270 |
| 2014/0133332 | A1* | 5/2014 | Lee | H04W 48/08 370/252 |
| 2014/0321282 | A1* | 10/2014 | Pragada | H04W 36/0072 370/235 |
| 2015/0143463 | A1 | 5/2015 | Baghel et al. | |
| 2015/0263957 | A1* | 9/2015 | Wang | H04W 4/90 370/230 |
| 2016/0127882 | A1* | 5/2016 | Agiwal | H04L 63/205 713/150 |
| 2017/0149743 | A1* | 5/2017 | Fukuda | H04L 63/0428 |
| 2017/0150326 | A1* | 5/2017 | Hampel | H04W 4/06 |
| 2017/0150363 | A1* | 5/2017 | Tenny | H04W 4/80 |
| 2017/0171882 | A1* | 6/2017 | Sundararajan | H04W 72/1268 |
| 2017/0339722 | A1* | 11/2017 | Jiao | H04W 68/005 |
| 2017/0374699 | A1 | 12/2017 | Yi et al. | |
| 2018/0083688 | A1* | 3/2018 | Agiwal | H04W 12/033 |
| 2018/0092139 | A1* | 3/2018 | Novlan | H04W 56/001 |
| 2018/0192328 | A1* | 7/2018 | Uzawa | H04W 28/14 |
| 2018/0270668 | A1* | 9/2018 | Nair | H04L 63/123 |
| 2018/0310202 | A1* | 10/2018 | Löhr | H04W 76/27 |

OTHER PUBLICATIONS

"3rd Generation Partnership Project; Technical Specification Group Radio Access Network; NG Radio Access Network; Overall Description; Stage 2 (Release 15)", 3GPP TS 38.300 V0.0.0, Mar. 2017, pp. 21-22.

"3rd Generation Partnership Project; Technical Specification Group Radio Access Network; NR; Packet Data Convergence Protocol (PDCP) specification (Release 15)", 3GPP TS 38.323 V15.0.0, Dec. 2017, pp. 1-25.

"3rd Generation Partnership Project; Technical Specification Group Services and System Aspects; System Architecture for the 5G System; Stage 2 (Release 15)", 3GPP TS 23.501 V2.0.0, Dec. 2017, pp. 1-183.

"Evolved Universal Terrestrial Radio Access (E-UTRA); Packet Data Convergence Protocol (PDCP) specification", 3GPP TS 36.323 version 13.6.0 Release 13, Jul. 2017, pp. 1-42.

"3GPP TR 38.801 V2.0.0 (Mar. 2017)", 3rd Generation Partnership Project; Technical Specification Group Radio Access Network; Study on New Radio Access Technology; Radio Access Architecture and Interfaces (Release 14), Mar. 2017, pp. 1-90.

"3GPP TS 33.401 V15.1.0 (Sep. 2017)", 3rd Generation Partnership Project; Technical Specification Group Services and System Aspects; 3GPP System Architecture Evolution (SAE); Security architecture (Release 15), Sep. 2017, pp. 1-161.

"3GPP TS 38.401 V15.0.0 (Dec. 2017)", 3rd Generation Partnership Project; Technical Specification Group Radio Access Network; NG-RAN; Architecture description (Release 15), Dec. 2017, pp. 1-23.

"3GPP TS 38.473 V15.0.0 (Dec. 2017)", 3rd Generation Partnership Project; Technical Specification Group Radio Access Network; NG-RAN; F1 application protocol (F1AP); (Release 15), Dec. 2017, pp. 1-90.

"NR; Radio Resource Control (RRC); Protocol specification", 3GPP TS 38.331 V0.0.4, Jun. 2017, pp. 1-22.

"3GPP TR 33.899 V1.2.0", 3rd Generation Partnership Project; Technical Specification Group Services and System Aspects; Study on the security aspects of the next generation system (Release 14), Jun. 2017, pp. 1-586.

\* cited by examiner

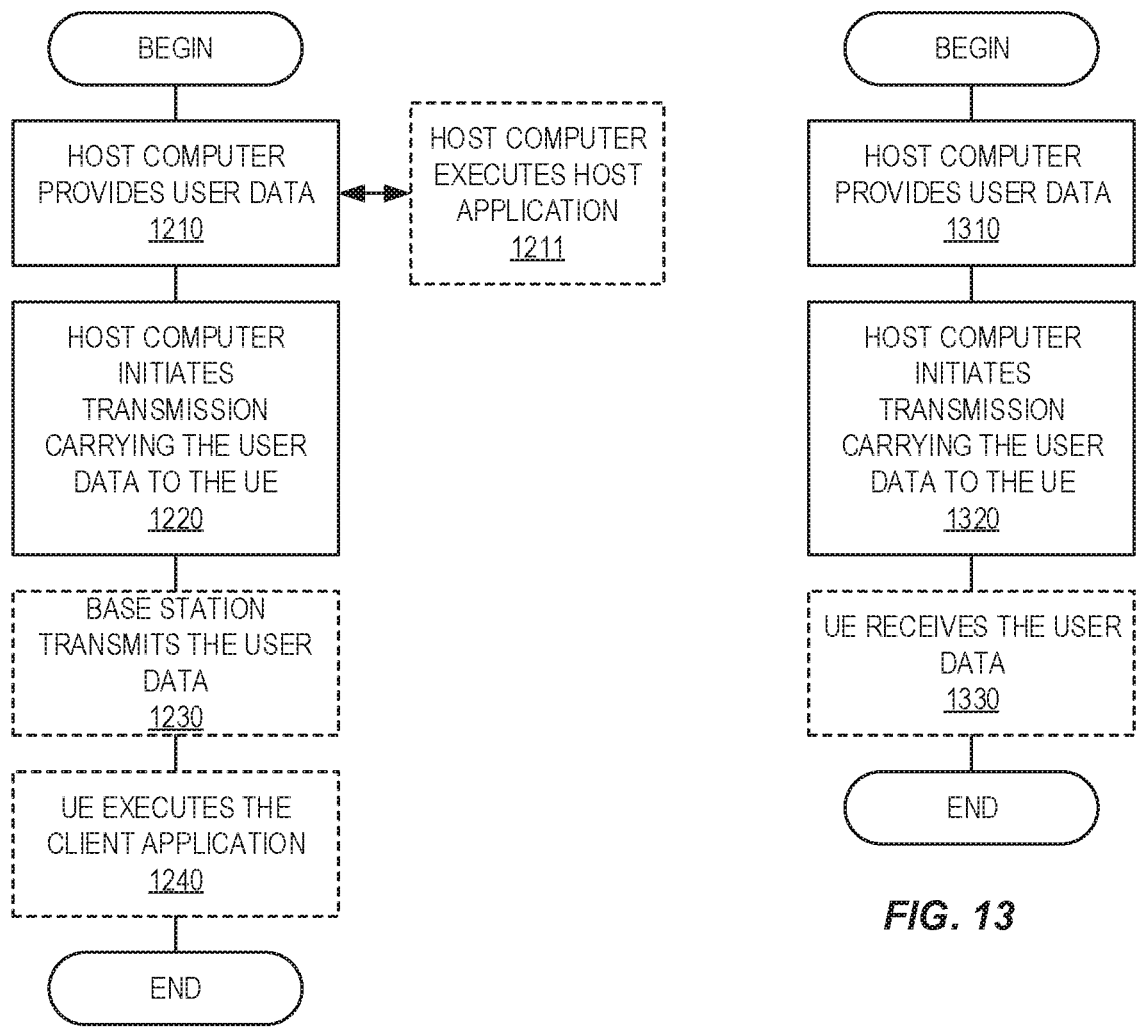

OPTIMIZED PDCP HANDLING IN INTEGRATED ACCESS BACKHAUL (IAB) NETWORKS

TECHNICAL FIELD

The present application relates generally to the field of wireless communication networks, and more specifically to so-called integrated access backhaul (IAB) networks in which network nodes utilize wireless communications both to provide access to devices and to relay (e.g., "backhaul") communications from devices and/or other nodes to a core network.

BACKGROUND

FIG. 1 illustrates a high-level view of a fifth-generation (5G) cellular (e.g., wireless) network architecture, consisting of a Next Generation RAN (NG-RAN) and a 5G Core (5GC). The NG-RAN can include a set of gNodeB's (gNBs) connected to the 5GC via one or more NG interfaces, whereas the gNBs can be connected to each other via one or more Xn interfaces. Each of the gNBs can support frequency division duplexing (FDD), time division duplexing (TDD), or a combination thereof. The radio technology for the NG-RAN is often referred to as "New Radio" (NR).

The NG RAN logical nodes shown in FIG. 1 (and described in TS 38.401 and TR 38.801) include a Central Unit (CU or gNB-CU) and one or more Distributed Units (DU or gNB-DU). The CU is a logical node that is a centralized unit that hosts high layer protocols and includes a number of gNB functions, including controlling the operation of DUs. A DU is a decentralized logical node that hosts lower layer protocols and can include, depending on the functional split option, various subsets of the gNB functions. (As used herein, the terms "central unit" and "centralized unit" are used interchangeably, and the terms "distributed unit" and "decentralized unit" are used interchangeability.) The gNB-CU connects to gNB-DUs over respective F1 logical interfaces. The gNB-CU and connected gNB-DUs are only visible to other gNBs and the 5GC as a gNB, e.g., the F1 interface is not visible beyond gNB-CU.

Furthermore, the F1 interface between the gNB-CU and gNB-DU is specified, or based on, the following general principles:
 F1 is an open interface;
 F1 supports the exchange of signalling information between respective endpoints, as well as data transmission to the respective endpoints;
 from a logical standpoint, F1 is a point-to-point interface between the endpoints (even in the absence of a physical direct connection between the endpoints);
 F1 supports control plane (CP) and user plane (UP) separation, such that a gNB-CU may be separated in CP and UP; F1 separates Radio Network Layer (RNL) and Transport Network Layer (TNL);
 F1 enables exchange of user-equipment (UE) associated information and non-UE associated information;
 F1 is defined to be future proof with respect to new requirements, services, and functions;
 A gNB terminates X2, Xn, NG and S1-U interfaces and, for the F1 interface between DU and CU, utilizes the F1 application part protocol (F1-AP) which is defined in 3GPP TS 38.473.

Furthermore, a CU can host protocols such as RRC and PDCP, while a DU can host protocols such as RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

It has also been agreed in 3GPP RAN3 Working Group (WG) to support a separation of the gNB-CU into a CU-CP function (including RRC and PDCP for signaling radio bearers) and CU-UP function (including PDCP for user plane). The CU-CP and CU-UP parts communicate with each other using the E1-AP protocol over the E1 interface. FIG. 2 shows an exemplary gNB architecture based on the DU-CU split and the further separation between CU-CP and CU-UP.

In the gNB split CU-DU architecture, DC can be achieved by means of allowing a UE to connect to multiple DUs served by the same CU or by allowing a UE to connect to multiple DUs served by different CUs. As illustrated in FIG. 1, a gNB can include a gNB-CU connected to one or more gNB-DUs via respective F1 interfaces, all of which are described hereinafter in greater detail. In the NG-RAN architecture, however, a gNB-DU can be connected to only a single gNB-CU.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In NG-Flex configuration, each gNB is connected to all 5GC nodes within a pool area. The pool area is defined in 3GPP TS 23.501. If security protection for control plane and user plane data on TNL of NG-RAN interfaces has to be supported, NDS/IP (3GPP TS 33.401) shall be applied.

Densification via the deployment of more and more base stations (e.g., macro or micro base stations) is one of the mechanisms that can be employed to satisfy the increasing demand for bandwidth and/or capacity in mobile networks, which is mainly driven by the increasing use of video streaming services. Due to the availability of more spectrum in the millimeter wave (mmw) band, deploying small cells that operate in this band is an attractive deployment option for these purposes. However, the normal approach of connecting the small cells to the operator's backhaul network with optical fiber can end up being very expensive and impractical. Employing wireless links for connecting the small cells to the operator's network is a cheaper and more practical alternative. One such approach is an integrated access backhaul (IAB) network where the operator can utilize part of the radio resources for the backhaul link.

Integrated Access and Backhaul (IAB) has been studied earlier in 3GPP in the scope of Long Term Evolution (LTE) Rel-10. In that work, an architecture was adopted where a Relay Node (RN) has the functionality of an LTE eNB and UE modem. The RN is connected to a donor eNB which has a S1/X2 proxy functionality hiding the RN from the rest of the network. That architecture enabled the Donor eNB to also be aware of the UEs behind the RN and hide any UE mobility between Donor eNB and Relay Node(2) on the same Donor eNB from the CN. During the Rel-10 study, other architectures were also considered including, e.g., where the RNs are more transparent to the Donor gNB and allocated a separate stand-alone P/S-GW node.

For 5G/NR, similar options utilizing IAB can also be considered. One difference compared to LTE is the gNB-CU/DU split described above, which separates time critical RLC/MAC/PHY protocols from less time critical RRC/PDCP protocols. It is anticipated that a similar split could also be applied for the IAB case. Other IAB-related differences anticipated in NR as compared to LTE are the support of multiple hops and the support of redundant paths.

Nevertheless, the NG-RAN split CU/DU architecture exemplified by FIG. 1 creates certain difficulties for IAB. For example, the potential for gNBs to connect through multiple RNs can create certain difficulties due to the cascading of the gNB-CU functionalities within those RNs.

SUMMARY

Accordingly, exemplary embodiments of the present disclosure address shortcomings in NG-RAN split DU/CU architectures that are arranged in an IAB configuration, thereby enabling the otherwise-advantageous deployment of IAB solutions. Such exemplary embodiments can include methods and/or procedures for reducing Packet Data Convergence Protocol (PDCP) processing performed in a node of a multi-hop, IAB network. For example, the exemplary methods and/or procedures can be performed by various network nodes in an IAB network (or components thereof), including gNB-CUs, intermediate IAB nodes, and IAB access nodes.

The exemplary methods and/or procedures can include receiving a configuration that includes a first characteristic associated with at least one of the following: the node and data packets received by the node. In some embodiments, the received configuration can also include an indication of whether to enable or to disable a first PDCP processing operation based on the first characteristic. In some embodiments, the received configuration can also include a second characteristic associated with at least one of the following: the node and data packets received by the node.

The exemplary methods and/or procedures can also include receiving a data packet having one or more packet characteristics, and determining if there is a match between the one or more packet characteristics and the first characteristic. The exemplary method and/or procedure can include enabling or disabling the first PDCP processing operation on the data packet based on the result of the determination. In some embodiments, the enabling or disabling can include enabling the first PDCP processing operation if the one or more packet characteristics match the first characteristic, and disabling the first PDCP processing operation if the one or more packet characteristics do not match the first characteristic. In some embodiments, enabling or disabling of the first PDCP processing operation can be further based on the indication and/or the second characteristic.

In some exemplary embodiments, the first PDCP processing operation can include one or more of encryption, decryption, integrity protection, and integrity verification of PDCP messages. In some exemplary embodiments, the first PDCP processing operation can include either the pair of encryption and integrity protection, or the pair of decryption and integrity verification. In such case, each operation of the pair can be enabled or disabled independently of the other operation of the pair.

In some exemplary embodiments, disabling the first PDCP processing operation can include performing at least one of a null ciphering algorithm and a null integrity protection algorithm. In some exemplary embodiments, the first characteristic can include a first data transmission protocol and, optionally, a second data transmission protocol. In some exemplary embodiments, the first characteristic can include a hop count threshold. In some exemplary embodiments, the first characteristic can include identities of one or more radio bearers used to carry data packets. In some embodiments, the first characteristic can include identification of first and second partitions of a GPRS Tunneling Protocol Tunnel Endpoint ID (GTP TEID) space. In some embodiments, the first characteristic can include a plurality of addresses associated with one or more user equipment, UEs, served by the IAB network.

Exemplary embodiments also include network nodes (e.g., gNB-CU, intermediate IAB nodes, IAB access nodes, or components thereof) configured and/or arranged to perform operations corresponding to various exemplary methods and/or procedures described herein. Other exemplary embodiments include non-transitory, computer-readable media storing computer-executable instructions embodying operations corresponding to various exemplary methods and/or procedures described herein.

BRIEF DESCRIPTION OF THE FIGURES

FIG. 12-15 are flow diagrams illustrating various exemplary methods and/or procedures implemented in a communication system, according to various exemplary embodiments of the present disclosure.

DETAILED DESCRIPTION

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Figure 1:
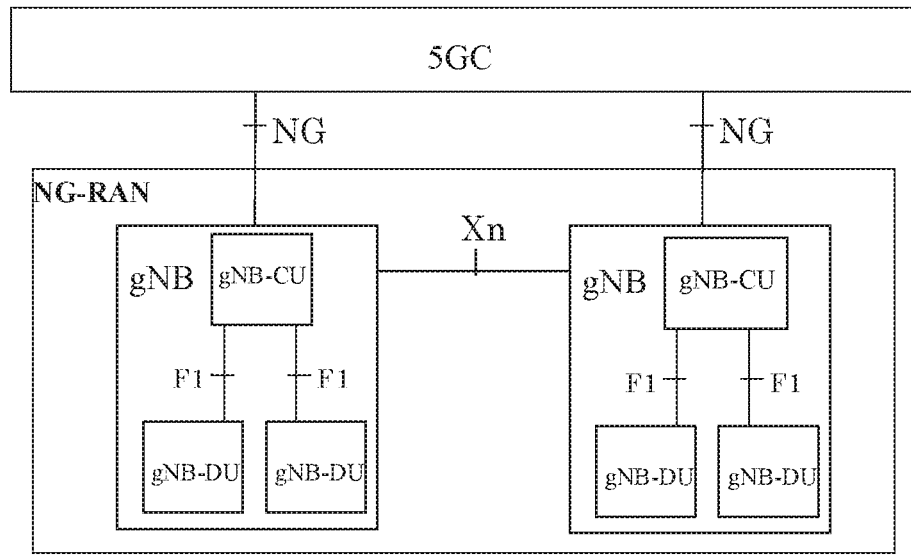
FIG. 1 illustrates a high-level view of a fifth-generation (5G) cellular (e.g., wireless) network architecture.
Figure 2:
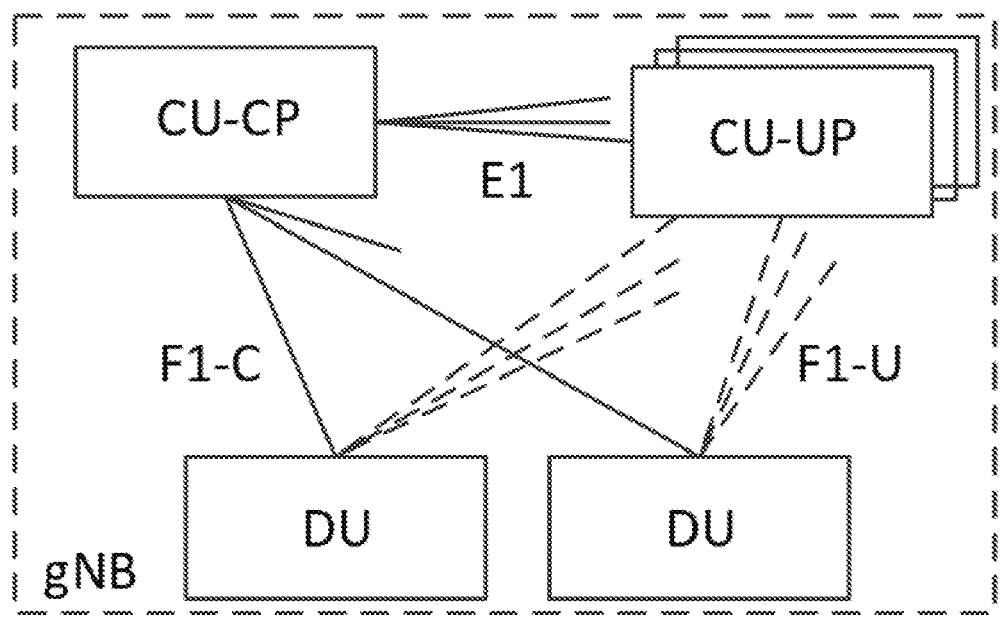
FIG. 2 shows an exemplary gNB architecture based on the DU-CU split and the further separation between CU-CP and CU-UP.

As briefly mentioned above, the NG-RAN split CU/DU architecture exemplified by FIG. 1 creates certain difficulties for IAB. For example, the potential for gNBs to connect through multiple RNs can create certain difficulties due to the cascading of the gNB-CU functionalities within those RNs. In LTE, the RN was a full eNB but the donor eNB had S1/X2 proxy functionality hiding the RN functionality from the rest of the network. In NR, the gNB-CU/DU split allows the CU functionality, which terminates RRC/PDCP and NG/Xn interfaces, to be located in a central place while the DU, which terminates RLC/MAC/PHY, to be distributed. As applied to IAB, the "DU" part of the IAB node would terminate RLC/MAC/PHY layers towards the user equipment (UE) while the RRC/PDCP layers would be terminated in the CU that is connected to the traditional transport network. In this solution, a logical F1 interface would be supported between "DU" part of the IAB node and the CU functionality.

Figure 3:
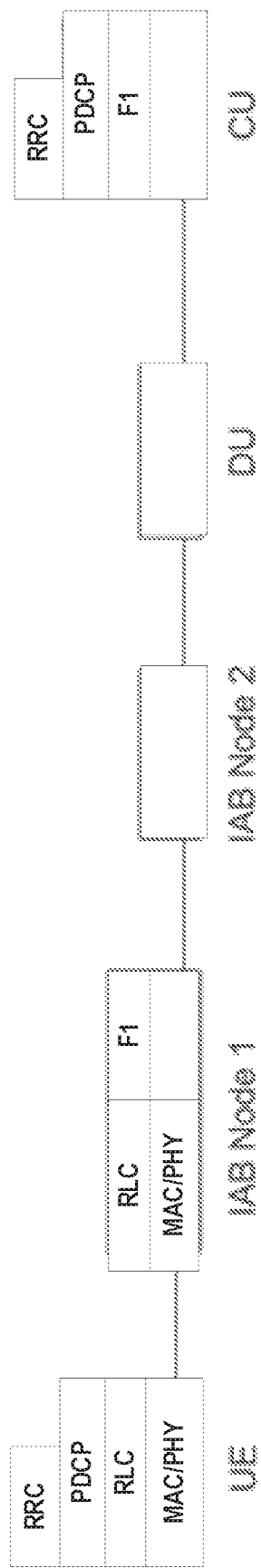
FIG. 3 shows an exemplary Integrated Access Backhaul (IAB) network architecture having a particular arrangement of protocol stacks and interfaces.

FIG. 3 shows an exemplary IAB network architecture embodying this arrangement of protocol stacks and interfaces. In this configuration, when the IAB node becomes operational, it will connect to the network as a special UE, receive its own IP address, and associate with a UPF (User Plane Function) in the operator's network. This UPF will receive data that is destined to the IAB node. For example, this UPF can be co-sited with the CU serving the IAB node. Once the IAB node has an IP address it can begin to establish the F1 interface to the CU, as customary for a DU. From the CU's point of view, the IAB node looks in principle as a normal DU, while from the core network (CN) point of view, the IAB node will resemble a UE.

Figure 4:
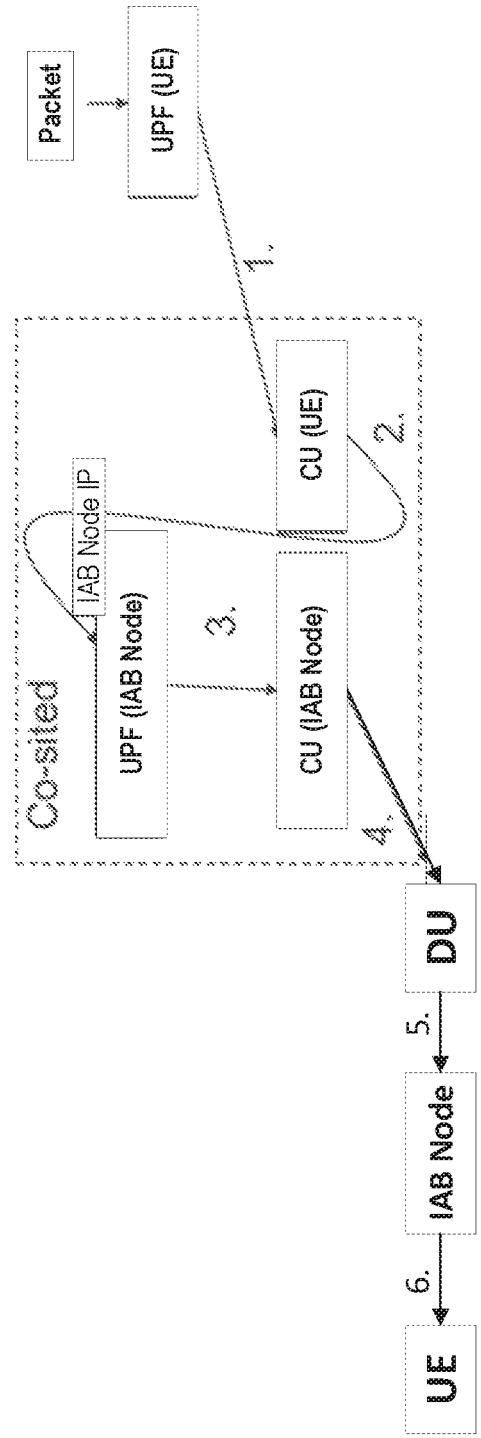
FIG. 4 shows an exemplary user plane (UP) data path for a single-hop IAB network.

FIG. 4 shows an exemplary user plane (UP, e.g., data) path for a single hop IAB node. The data flow path for a packet destined for the UE is described by the following numbered operations, which correspond to the numerical labels in FIG. 4:

1. A downlink (DL) packet destined for the UE passes through the UPF for the UE, and is sent to the CU that is serving the UE.
2. The CU which has the UE's context knows that the UE is located in the IAB Node and therefore sends the packet in a F1-U GTP tunnel to the IAB Node's IP address.
3. The UPF function serving the IAB Node knows that the IAB Node is located in the CU that has the IAB Node's context.
4. The CU with the IAB context knows the IAB is located under DU and therefore sends the packet in a F1-U GTP tunnel to the DU's IP address.
5. The DU decapsulates the F1-U GTP tunnel and delivers the packet to the IAB Node on a radio bearer belonging to the IAB node.
6. The IAB node decapsulates the F1-U GTP tunnel and delivers the packet to the UE on a radio bearer belonging to the UE.

The advantage of this approach is that it has minimum impact on existing standards since normal UE/network functionalities are reused. It also transparently supports any IP traffic towards the IAB node. Nevertheless, one drawback with this approach is that each IAB node will have its own UPF function, resulting in cascaded UPF and CU functions for multi-hopping scenarios where IAB nodes that connect through other IAB nodes. For example, a DL packet to the UE would first transition the UPF of the first IAB node, then the CU of the first IAB node, then the UPF of the second IAB node (e.g., that the first IAB node is connected to), then the CU of the second IAB node, etc. Each loop will increase processing time and reduce capacity by adding overhead (e.g., GTP/UDP/IP/PDCP).

Figure 5:
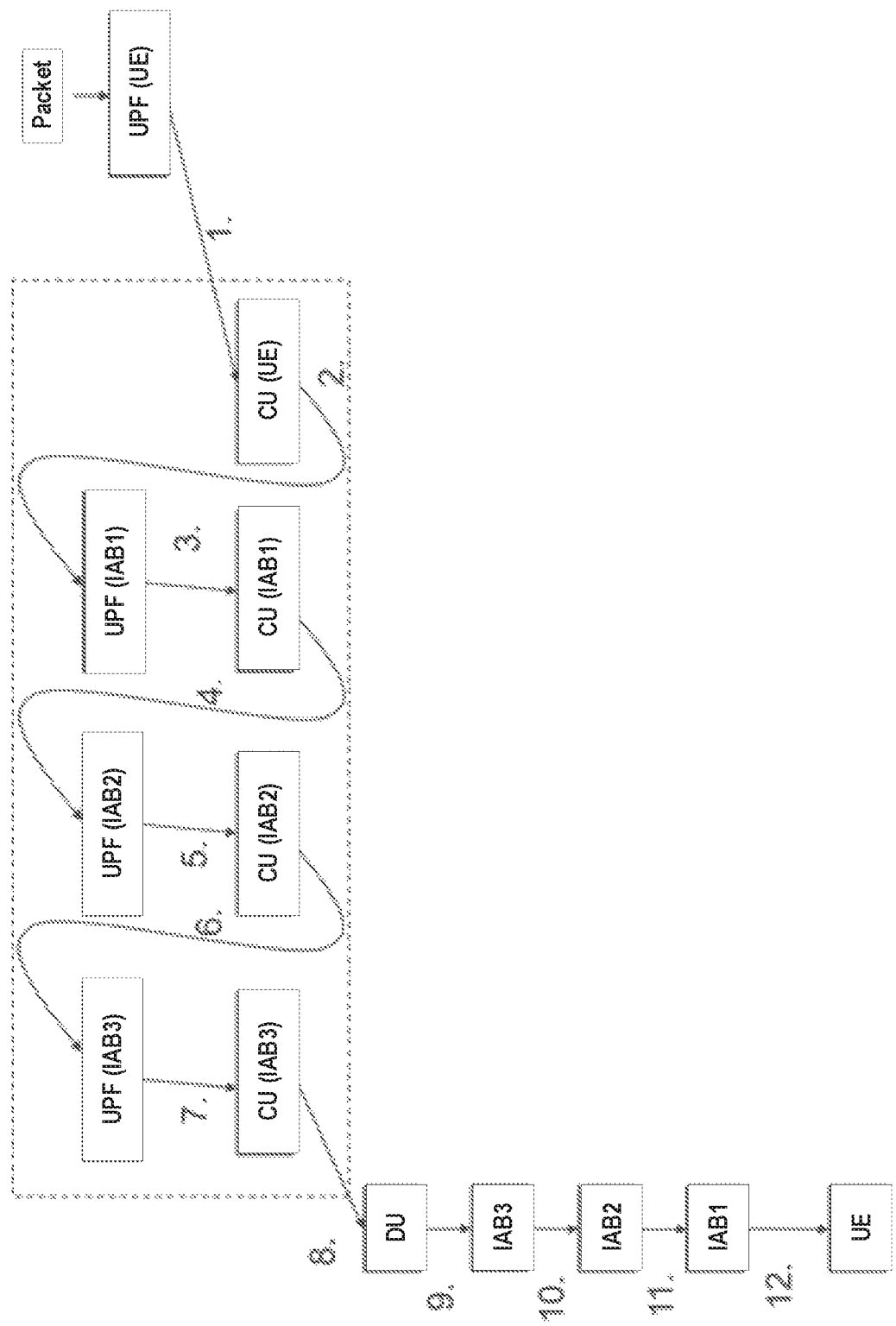
FIG. 5 illustrates an exemplary path of user-plane (UP) data in an exemplary three-hop IAB arrangement in which a data packet transits UPFs associated with each of the three IAB nodes.

FIG. 5 illustrates an exemplary path of user-plane (UP) data in an exemplary multi-hop IAB arrangement where two UEs communicate through respective three-hop configurations. Each of the numerical labels in FIG. 5 corresponds to a particular operation, in a similar manner as discussed above in relation to FIG. 4. The overhead introduced in the various operations shown in FIG. 5 is described below, with numbers corresponding to labels in the figure.

1. NG-U GTP/UDP/IP(UE)
2. PDCP(UE)+F1-U GTP/UDP/IP(IAB1)
3. PDCP(UE)+F1-U GTP/UDP/IP(IAB1)+NG-U GTP/UDP/IP(IAB1)
4. PDCP(UE)+F1-U GTP/UDP/IP(IAB1)+PDCP(IAB1)+F1-U GTP/UDP/IP(IAB2)
5. PDCP(UE)+F1-U GTP/UDP/IP(IAB1)+PDCP(IAB1)+F1-U GTP/UDP/IP(IAB2)+NG-U GTP/UDP/IP(IAB2)
6. PDCP(UE)+F1-U GTP/UDP/IP(IAB1)+PDCP(IAB1)+F1-U GTP/UDP/IP(IAB2)+PDCP(IAB2)+F1-U GTP/UDP/IP(IAB3)
7. PDCP(UE)+F1-U GTP/UDP/IP(IAB1)+PDCP(IAB1)+F1-U GTP/UDP/IP(IAB2)+PDCP(IAB2)+F1-U GTP/UDP/IP(IAB3)+NG-U GTP/UDP/IP(IAB3)
8. PDCP(UE)+F1-U GTP/UDP/IP(IAB1)+PDCP(IAB1)+F1-U GTP/UDP/IP(IAB2)+PDCP(IAB2)+F1-U GTP/UDP/IP(IAB3)+PDCP (IAB3)+F1-U GTP/UDP/IP(DU)
9. PDCP(UE)+F1-U GTP/UDP/IP(IAB1)+PDCP(IAB1)+F1-U GTP/UDP/IP(IAB2)+PDCP(IAB2)+F1-U GTP/UDP/IP(IAB3)+PDCP (IAB3)+RLC/MAC/PHY (IAB3)
10. PDCP(UE)+F1-U GTP/UDP/IP(IAB1)+PDCP(IAB1)+F1-U GTP/UDP/IP(IAB2)+PDCP(IAB2)+RLC/MAC/PHY (IAB2)

11. PDCP(UE)+F1-U GTP/UDP/IP(IAB1)+PDCP(IAB1)+RLC/MAC/PHY (IAB1)
12. PDCP(UE)+RLC/MAC/PHY (UE)

For control plane data (e.g., RRC protocol), the situation is similar except that there is no operation 1, as the message originates from the CU (UE).

As can be seen in FIG. 5, between operations 2 and 12, there are eight (8) PDCP header processings, e.g., addition and later removal of PDCP(UE), PDCP(IAB1), PDCP(IAB2), and PDCP(IAB3). The addition of a PDCP header can entail encryption and (optionally) integrity protection. The integrity protection is customarily used for CP data (e.g., RRC protocol), but it can also be used for UP data (e.g., for UP integrity protection in NR). Similarly, removal of a PDCP header can entail complementary operations, e.g., decryption and integrity verification. Performing all these encryption, decryption, integrity protection, and integrity verification operations for every packet can produce considerable increases in latency, processing load, power consumption, and hardware requirements. Despite their other advantages, such requirements could make multi-hop IAB systems unfeasible for networks that support highly delay-sensitive services.

Exemplary embodiments of the present disclosure mitigate, reduce, and/or eliminate the above-described issues incurred due to PDCP processing in a multi-hop IAB systems, by selectively enabling or disabling the encryption and/or the integrity protection (and/or the complementary decryption and/or integrity verification operations) in various ones of the IAB hops. Such selective enabling/disabling can be performed on a per-data-packet basis. Exemplary embodiments can base the selective enabling/disabling on several factors including, e.g., the number of hops, whether the particular packet is UP or CP traffic, QoS requirements of the bearer associated with the particular packet, whether the data comprising the packet belongs to UEs, UE handling functions, operation and maintenance signaling, etc.

By reducing the unnecessary processing through the selective enabling/disabling, exemplary embodiments can provide various benefits including lower power consumption in the network, resulting in cost and environmental benefits. Other exemplary benefits include reduced latency in the network, leading to improved end-user performance or quality of experience (QoE). Other exemplary benefits include reduced hardware requirements (e.g., fewer processors and memories), which can reduce network deployment cost and reduce environmental impact caused by manufacture, shipping, installation, etc. of hardware components.

Exemplary embodiments can provide such benefits utilizing various approaches. In some exemplary embodiments, encryption can be enabled on the access link (e.g., the link between the UE and network) but disabled/inactive on the other links of a multi-hop IAB system. In such exemplary embodiments, the selective disabling of the encryption on the other links can be achieved by configuring the PDCP protocol stacks in the CUs of the IAB nodes comprising these links to use the 3GPP null ciphering algorithm (eea0).

The operations of such exemplary embodiments can be illustrated in the context of FIG. 5 and the corresponding overhead in the numerically-labeled operations, discussed above. With the PDCP encryption and/or decryption configured to be disabled on all links except for the access link of the UE, after being selectively configured in this manner, IAB nodes of the exemplary embodiments perform the following operations that result in the reduced overhead illustrated above:

The CU serving IAB1 node (e.g., between Operations 3-4) is configured to disable (e.g., not apply) PDCP ciphering/encryption on some packets associated with UEs which are connected to the IAB1 node. When receiving such packets, this CU does not apply encryption.

The CU serving IAB2 node (e.g., between Operations 5-6) is configured to disable (e.g., not apply) PDCP ciphering/encryption on some packets associated with IAB1 node which are connected to the IAB2 node. When receiving such packets, this CU does not apply encryption.

The CU serving the IAB3 node (e.g., between Operations 7-8) is configured to disable (e.g., not apply) PDCP ciphering/encryption on some packets associated with IAB2 which are connected to the IAB3 node. When receiving such packets, this CU does not apply encryption.

In Operation 9 (IAB3), the PDCP layer is configured not to "decrypt" some packets associated with bearers used to service nodes or UEs connected to IAB3. When receiving such packets, this PDCP layer does not apply decryption.

In Operation 10 (IAB2), the PDCP layer is configured not to "decrypt" some packets associated with bearers used to service nodes or UEs connected to IAB2. When receiving such packets, this PDCP layer does not apply decryption.

In Operation 11 (IAB1), the PDCP layer is configured not to "decrypt" some packets associated with bearers used to service nodes or UEs connected to IAB1. When receiving such packets, this PDCP layer does not apply decryption.

By operating according to this configuration, exemplary embodiments reduce the overhead in the numerically-labelled operations in FIG. 5. The strikethrough text in the operations below indicate where PDCP layers would either be empty or set to null ciphering according to the configuration applied.

1. NG-U GTP/UDP/IP(UE)
2. PDCP(UE)+F1-U GTP/UDP/IP(IAB1)
3. PDCP(UE)+F1-U GTP/UDP/IP(IAB1)+NG-U GTP/UDP/IP(IAB1)
4. PDCP(UE)+F1-U GTP/UDP/IP(IAB1)+F1-U GTP/UDP/IP(IAB2)
5. PDCP(UE)+F1-U GTP/UDP/IP(IAB1)+F1-U GTP/UDP/IP(IAB2)+NG-U GTP/UDP/IP(IAB2)
6. PDCP(UE)+F1-U GTP/UDP/IP(IAB1)+F1-U GTP/UDP/IP(IAB2)+F1-U GTP/UDP/IP(IAB3)
7. PDCP(UE)+F1-U GTP/UDP/IP(IAB1)+F1-U GTP/UDP/IP(IAB2)+F1-U GTP/UDP/IP(IAB3)+NG-U GTP/UDP/IP(IAB3)
8. PDCP(UE)+F1-U GTP/UDP/IP(IAB1)+F1-U GTP/UDP/IP(IAB2)+F1-U GTP/UDP/IP(IAB3)+F1-U GTP/UDP/IP(DU)
9. PDCP(UE)+F1-U GTP/UDP/IP(IAB1)+F1-U GTP/UDP/IP(IAB2)+F1-U GTP/UDP/IP(IAB3)+RLC/MAC/PHY (IAB3)
10. PDCP(UE)+F1-U GTP/UDP/IP(IAB1)+F1-U GTP/UDP/IP(IAB2)+RLC/MAC/PHY (IAB2)
11. PDCP(UE)+F1-U GTP/UDP/IP(IAB1)+RLC/MAC/PHY (IAB1)
12. PDCP(UE)+RLC/MAC/PHY (UE)

Although the exemplary operations illustrated above, and in FIG. 5, are shown for a DL packet destined for the UE (e.g., in operation 12), skilled persons will readily comprehend that substantially similar operations can be applied to handling of UL packets that originate at the UE. In such case, the IAB nodes (9-11) determine whether to apply encryption, and CU functions do not apply decryption.

In other exemplary embodiments, encryption can be enabled only for the hops greater than a certain configurable value. For example, configuring this parameter to "3" in the deployment scenario shown in FIG. 5 will disable the encryption for the PDCP layer of IAB3, whereas configuring the parameter to "2" will disable it for the PDCPs of IAB2 and IAB3.

In some exemplary embodiments, integrity protection can be enabled on the access link (e.g., the link between the UE and network) but disabled/inactive on the other links of a multi-hop IAB system. In such exemplary embodiments, the selective disabling of the integrity protection on the other links can be achieved by configuring the PDCP protocol stacks in the CUs of the IAB nodes comprising these links to use the 3GPP null integrity protection algorithm (eia0). In some exemplary embodiments, integrity protection can be enabled only for the hops greater than a certain configurable value. For example, configuring this parameter to "3" in the deployment scenario shown in FIG. 5 will disable the integrity protection for the PDCP layer of IAB3, whereas configuring the parameter to "2" will disable integrity protection for the PDCPs of IAB2 and IAB3.

In some exemplary embodiments, one of the integrity protection and encryption (and/or one of the complementary integrity verification and decryption) operations can be selectively enabled/disabled independent of the other. In other exemplary embodiments, selectively enabling/disabling one of these two operations can result in a corresponding selective enabling/disabling of the other operation. In some exemplary embodiments, selective enabling/disabling encryption (and/or integrity protection) can be performed on a per-radio-bearer basis.

In some exemplary embodiments, an IAB node that is selectively configured to enable/disable encryption (and/or integrity protection) for certain types of packets (e.g., from certain nodes) can process incoming packets by inspecting header of data packet to determine if the incoming packets are addressed to CUs of the IAB nodes for which encryption (and/or integrity protection) has been selectively enabled/disabled. In the context the example scenario shown in FIG. 5, this can result in the CU(UE) encrypting a packet whose address indicates that is destined for a UE, while the other CUs (IAB1-3) will not apply encryption to the same packet, since its address indicates that it is destined for an IAB node.

In some exemplary embodiments, the GPRS Tunneling Protocol (GTP) Tunnel Endpoint ID (TEID) space can be used to determine the selective enabling/disabling of encryption or/and integrity protection in the CU of IAB nodes. For example, the GTP TEID space towards the CUs can be partitioned into "to be encrypted" and "not to be encrypted" parts, where PDCP encryption and/or integrity protection is applied to the packets arriving in a TEID belonging to the "to be encrypted" partition but not applied to packets arriving in a TEID belonging to the "not to be encrypted" partition. The boundaries of the two partitions can be determined based on various criteria including, e.g., quality of service (QoS) requirements of bearers and/or users.

In some exemplary embodiments, the type of protocol or logical interface used by the arriving packets can be used to determine whether to apply the selective enabling/disabling of encryption or/and integrity protection in the CU of IAB nodes. For example, the CUs of the IAB nodes can differentiate between arriving packets that are using Stream Control Transmission Protocol (SCTP, e.g., via F1-C interface) and arriving packets that are using GPRS Tunneling Protocol (GTP, e.g., via F1-U interface). For example, if the CU determines that a packet is an SCTP message over F1-C, the CU can apply encryption and/or integrity protection non-selectively.

On the other hand, if the CU determines that a packet is a GTP message over F1-U, then other criteria and/or characteristics, including those discussed herein, can be used to determine whether encryption and/or integrity protection should be selectively enabled or disabled for such GTP message. As another example, the CU can base this decision on the type of GTP packet, e.g., GTP-C, GTP-U, or GTP'.

In some exemplary embodiments, the selective enabling/disabling of encryption and/or integrity protection can be applied to an IAB node that is connected to a donor IAB node or other IAB node using multiple radio bearers.

Figure 6:
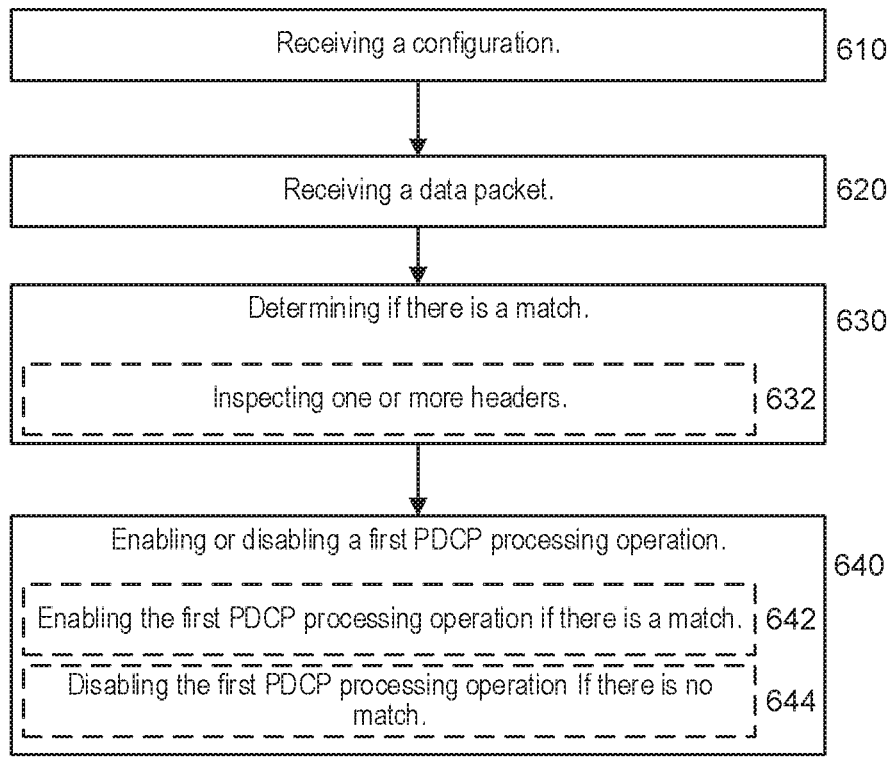
FIG. 6 shows a flow diagram for an exemplary method and/or procedure performed a network node in an IAB network, according to various embodiments of the present disclosure.

FIG. 6 illustrates an exemplary method and/or procedure for reducing Packet Data Convergence Protocol (PDCP) processing performed in a node of a multi-hop, integrated access backhaul (IAB) communication network, in accordance with particular exemplary embodiments of the present disclosure. The exemplary method and/or procedure can be performed, for example, by various network nodes in an IAB network (or components thereof), including gNB-CUs, intermediate IAB nodes, and IAB access nodes. Although the exemplary method and/or procedure is illustrated in FIG. 6 by blocks in a particular order, this order is exemplary and the operations corresponding to the blocks can be performed in different orders, and can be combined and/or divided into blocks having different functionality than shown in FIG. 6. Furthermore, exemplary method and/or procedure shown in FIG. 6 can be complimentary to other exemplary methods and/or procedures disclosed herein, such that they are capable of being used cooperatively to provide the benefits, advantages, and/or solutions to problems described hereinabove. Optional operations are illustrated by dashed lines.

The exemplary method and/or procedure includes the operations of block 610, where the network node can receive a configuration. For example, the received configuration can include a first characteristic associated with at least one of the following: the node and data packets received by the node. In some embodiments, the received configuration can also include an indication of whether to enable or to disable a first PDCP processing operation based on the first characteristic. In some embodiments, the received configuration can also include a second characteristic associated with at least one of the following: the node and data packets received by the node.

The exemplary method and/or procedure can also include the operations of block 620, where the node can receive a data packet, such as a data packet having one or more packet characteristics. The exemplary method and/or procedure can also include the operations of block 630, where the node can determine if there is a match, such as between the one or more packet characteristics and the first characteristic. In some embodiments, the operation of block 630 can also include the operation of sub-block 632, where the network node can inspect one or more headers comprising the data packet, e.g., to determine if there is a match.

The exemplary method and/or procedure can also include the operations of block 640, where the node can enable or disable the first PDCP processing operation, e.g., based on the result of the determination. In some embodiments, enabling or disabling of the first PDCP processing operation can be further based on the indication. In some embodiments, the operations of block 640 can also include the operations of block 642, where the network node can enable the first PDCP processing operation on the data packet if the one or more packet characteristics match the first characteristic. In some embodiments, the operations of block 640 can also include the operations of block 644, where the network node can disable the first PDCP processing operation on the data packet if the one or more packet characteristics do not match the first characteristic.

In some exemplary embodiments, the first PDCP processing operation can include encryption, decryption, integrity protection, and/or integrity verification of PDCP messages. In some exemplary embodiments, the first PDCP processing operation one of the following pairs of operations: encryption and integrity protection, and decryption and integrity verification. In such case, the operations of block 640 can include enabling or disabling each operation of the pair can be enabled or disabled independently of the other operation of the pair.

In some exemplary embodiments, the disabling operations of block 644 can include performing at least one of a null ciphering algorithm and a null integrity protection algorithm. In some exemplary embodiments, the at least one characteristic can include at least one protocol used for a data packet.

In some exemplary embodiments, the first characteristic can include a first data transmission protocol, and the one or more packet characteristics can include one or more protocols used to transmit the data packet. In such embodiments, the first PDCP processing operation can be enabled if the one or more protocols include the first data transmission protocol. In some embodiments, the first data transmission protocol can be associated with control-plane traffic in the IAB network but not associated with user-plane traffic in the IAB network.

In some embodiments, the first characteristic can also include a second data transmission protocol, and the received configuration can also include a second characteristic associated with at least one of the following: the node and data packets received by the node. In such embodiments, the enabling or disabling operations in block 640 can be based on whether the one or more protocols used to transmit the data packet include the second protocol, and whether the one or more packet characteristics match the second characteristic. In some embodiments, the first data transmission protocol can be Stream Control Transmission Protocol (SCTP), and the second data transmission protocol can GPRS Tunneling Protocol (GTP). In such embodiments, the second characteristic can be a GTP packet type.

In some embodiments, the first characteristic can include identities of one or more radio bearers used to carry data packets, and the one or more packet characteristics can include a radio bearer used to transmit the data packet. In such embodiments, the first PDCP processing operation can be enabled if the identities of the one or more radio bearers include the radio bearer used to transmit the data packet. Likewise, the first PDCP processing operation can be disabled if the identities of the one or more radio bearers do not include the radio bearer used to transmit the data packet.

In some embodiments, the first characteristic can include identification of first and second partitions of a GPRS Tunneling Protocol Tunnel Endpoint ID (GTP TEID) space, and the one or more packet characteristics can include a GTP TEID associated with the data packet. In such embodiments, the first PDCP processing operation can be enabled if the GTP TEID associated with the data packet is included in the first partition. Likewise, the first PDCP processing operation can be disabled if the GTP TEID associated with the data packet is included in the second partition.

In some embodiments, the first characteristic can include a plurality of addresses associated with one or more UEs served by the IAB network, and the one or more packet characteristics can include an address included in a header of the data packet. In such embodiments, the first PDCP processing operation can be enabled if the address is included in the plurality of addresses. Likewise, the first PDCP processing operation can be disabled if the address is not included in the plurality of addresses.

In some embodiments, the received configuration (e.g., in block 610) can also include an indication of whether to enable or to disable the first PDCP processing operation based on the first characteristic. In such embodiments, the enabling or disabling operations in block 640 can also be based on this indication.

In some embodiments, the data packet can be a DL data packet, such that the method can be performed by a gNB-DU or an IAB node. In other embodiments, the data packet can be an UL data packet, such that the method can be performed by an IAB node.

Figure 7:
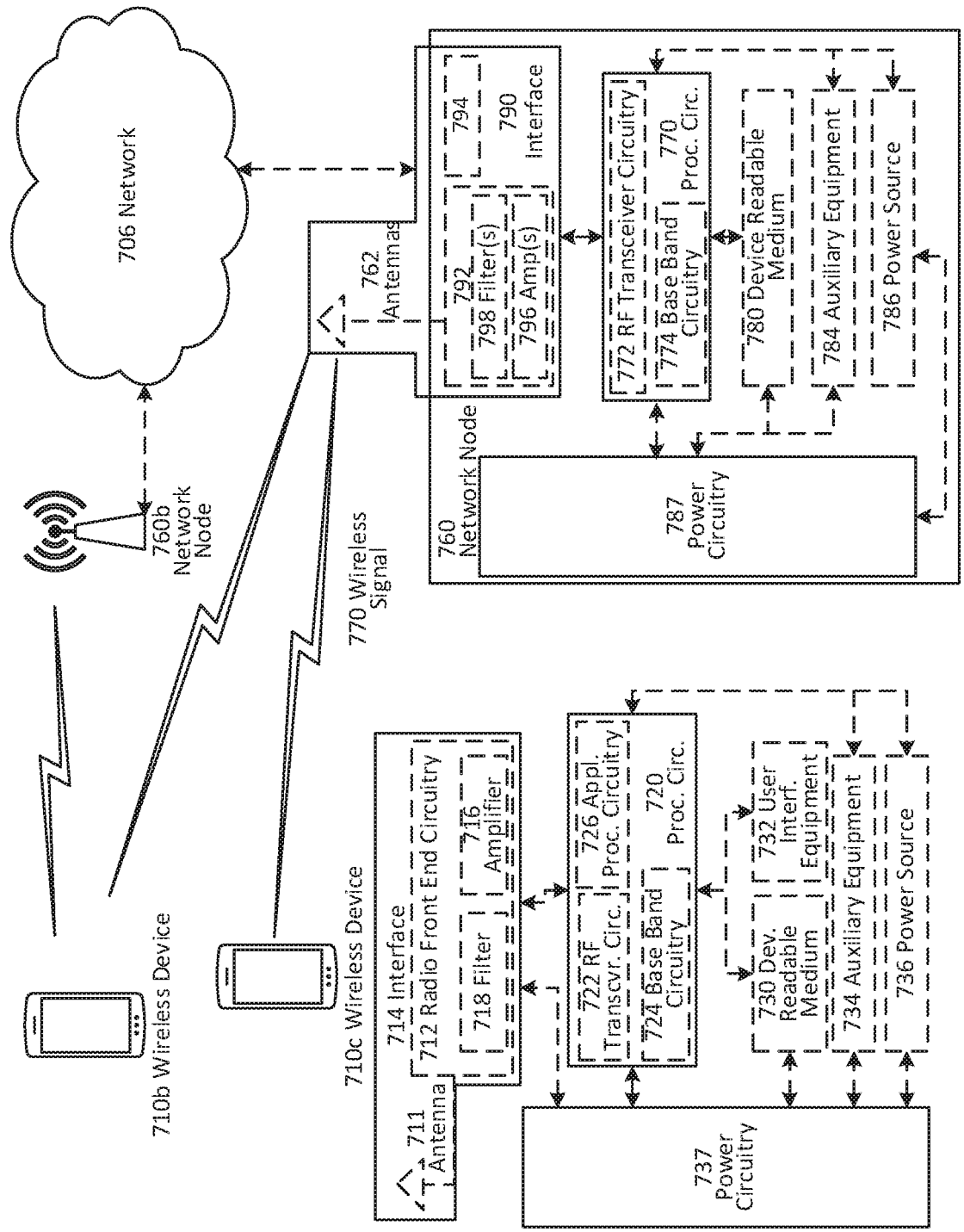
FIG. 7 is a block diagram of an exemplary wireless network configurable according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 7. For simplicity, the wireless network of FIG. 7 only depicts network 706, network nodes 760 and 760*b*, and WDs 710, 710*b*, and 710*c*. In practice, a wireless network can further include any additional elements suitable to support communication between wireless devices or between a wireless device and another communication device, such as a landline telephone, a service provider, or any other network node or end device. Of the illustrated components, network node 760 and wireless device (WD) 710 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 706 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 760 are depicted as single boxes located within a larger box, or nested within multiple boxes, in practice, a network node can comprise multiple different physical components that make up a single illustrated component (e.g., device readable medium 780 can comprise multiple separate hard drives as well as multiple RAM modules).

Similarly, network node 760 can be composed of multiple physically separate components (e.g., a NodeB component and a RNC component, or a BTS component and a BSC component, etc.), which can each have their own respective components. In certain scenarios in which network node 760 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 760 can be configured to support multiple radio access technologies (RATs). In such embodiments, some components can be duplicated (e.g., separate device readable medium 780 for the different RATs) and some components can be reused (e.g., the same antenna 762 can be shared by the RATs). Network node 760 can also include multiple sets of the various illustrated components for different wireless technologies integrated into network node 760, such as, for example, GSM, WCDMA, LTE, NR, WiFi, or Bluetooth wireless technologies. These wireless technologies can be integrated into the same or different chip or set of chips and other components within network node 760.

Processing circuitry 770 can be configured to perform any determining, calculating, or similar operations (e.g., certain obtaining operations) described herein as being provided by a network node. These operations performed by processing circuitry 770 can include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 can execute instructions stored in device readable medium 780 or in memory within processing circuitry 770. Such functionality can include providing any of the various wireless features, functions, or benefits discussed herein. In some embodiments, processing circuitry 770 can include a system on a chip (SOC).

In some embodiments, processing circuitry 770 can include one or more of radio frequency (RF) transceiver circuitry 772 and baseband processing circuitry 774. In some embodiments, radio frequency (RF) transceiver circuitry 772 and baseband processing circuitry 774 can be on separate chips (or sets of chips), boards, or units, such as radio units and digital units. In alternative embodiments, part or all of RF transceiver circuitry 772 and baseband processing circuitry 774 can be on the same chip or set of chips, boards, or units In certain embodiments, some or all of the functionality described herein as being provided by a network node, base station, eNB or other such network device can be performed by processing circuitry 770 executing instructions stored on device readable medium 780 or memory within processing circuitry 770. In alternative embodiments, some or all of the functionality can be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760, but are enjoyed by network node 760 as a whole, and/or by end users and the wireless network generally.

Device readable medium 780 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 770. Device readable medium 780 can store any suitable instructions, data or information, including a computer program, software, an application including one or more of logic, rules, code, tables, etc. and/or other instructions capable of being executed by processing circuitry 770 and, utilized by network node 760. Device readable medium 780 can be used to store any calculations made by processing circuitry 770 and/or any data received via interface 790. In some embodiments, processing circuitry 770 and device readable medium 780 can be considered to be integrated.

Interface 790 is used in the wired or wireless communication of signalling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that can be coupled to, or in certain embodiments a part of, antenna 762. Radio front end circuitry 792 comprises filters 798 and amplifiers 796. Radio front end circuitry 792 can be connected to antenna 762 and processing circuitry 770. Radio front end circuitry can be configured to condition signals communicated between antenna 762 and processing circuitry 770. Radio front end circuitry 792 can receive digital data that is to be sent out to other network nodes or WDs via a wireless connection. Radio front end circuitry 792 can convert the digital data into a radio signal having the appropriate channel and bandwidth parameters using a combination of filters 798 and/or amplifiers 796. The radio signal can then be transmitted via antenna 762. Similarly, when receiving data, antenna 762 can collect radio signals which are then converted into digital data by radio front end circuitry 792. The digital data can be passed to processing circuitry 770. In other embodiments, the interface can comprise different components and/or different combinations of components.

In certain alternative embodiments, network node 760 may not include separate radio front end circuitry 792, instead, processing circuitry 770 can comprise radio front end circuitry and can be connected to antenna 762 without separate radio front end circuitry 792. Similarly, in some embodiments, all or some of RF transceiver circuitry 772 can be considered a part of interface 790. In still other embodiments, interface 790 can include one or more ports or terminals 794, radio front end circuitry 792, and RF transceiver circuitry 772, as part of a radio unit (not shown), and interface 790 can communicate with baseband processing circuitry 774, which is part of a digital unit (not shown).

Antenna 762 can include one or more antennas, or antenna arrays, configured to send and/or receive wireless signals. Antenna 762 can be coupled to radio front end circuitry 790 and can be any type of antenna capable of transmitting and receiving data and/or signals wirelessly. In some embodiments, antenna 762 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 762 can be separate from network node 760 and can be connectable to network node 760 through an interface or port.

Antenna 762, interface 790, and/or processing circuitry 770 can be configured to perform any receiving operations and/or certain obtaining operations described herein as being performed by a network node. Any information, data and/or signals can be received from a wireless device, another network node and/or any other network equipment. Similarly, antenna 762, interface 790, and/or processing circuitry 770 can be configured to perform any transmitting operations described herein as being performed by a network node. Any information, data and/or signals can be transmitted to a wireless device, another network node and/or any other network equipment.

Power circuitry 787 can comprise, or be coupled to, power management circuitry and can be configured to supply the components of network node 760 with power for performing the functionality described herein. Power circuitry 787 can receive power from power source 786. Power source 786 and/or power circuitry 787 can be configured to provide power to the various components of network node 760 in a form suitable for the respective components (e.g., at a voltage and current level needed for each respective component). Power source 786 can either be included in, or external to, power circuitry 787 and/or network node 760. For example, network node 760 can be connectable to an external power source (e.g., an electricity outlet) via an input circuitry or interface such as an electrical cable, whereby the external power source supplies power to power circuitry 787. As a further example, power source 786 can comprise a source of power in the form of a battery or battery pack which is connected to, or integrated in, power circuitry 787. The battery can provide backup power should the external power source fail. Other types of power sources, such as photovoltaic devices, can also be used.

Alternative embodiments of network node 760 can include additional components beyond those shown in FIG. 7 that can be responsible for providing certain aspects of the network node's functionality, including any of the functionality described herein and/or any functionality necessary to support the subject matter described herein. For example, network node 760 can include user interface equipment to allow and/or facilitate input of information into network node 760 and to allow and/or facilitate output of information from network node 760. This can allow and/or facilitate a user to perform diagnostic, maintenance, repair, and other administrative functions for network node 760.

As used herein, wireless device (WD) refers to a device capable, configured, arranged and/or operable to communicate wirelessly with network nodes and/or other wireless devices. Unless otherwise noted, the term WD can be used interchangeably with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 710 includes antenna 711, interface 714, processing circuitry 720, device readable medium 730, user interface equipment 732, auxiliary equipment 734, power source 736 and power circuitry 737. WD 710 can include multiple sets of one or more of the illustrated components for different wireless technologies supported by WD 710, such as, for example, GSM, WCDMA, LTE, NR, WiFi, WiMAX, or Bluetooth wireless technologies, just to mention a few. These wireless technologies can be integrated into the same or different chips or set of chips as other components within WD 710.

Antenna 711 can include one or more antennas or antenna arrays, configured to send and/or receive wireless signals, and is connected to interface 714. In certain alternative embodiments, antenna 711 can be separate from WD 710 and be connectable to WD 710 through an interface or port. Antenna 711, interface 714, and/or processing circuitry 720 can be configured to perform any receiving or transmitting operations described herein as being performed by a WD. Any information, data and/or signals can be received from a network node and/or another WD. In some embodiments, radio front end circuitry and/or antenna 711 can be considered an interface.

As illustrated, interface 714 comprises radio front end circuitry 712 and antenna 711. Radio front end circuitry 712 comprise one or more filters 718 and amplifiers 716. Radio front end circuitry 714 is connected to antenna 711 and processing circuitry 720, and can be configured to condition signals communicated between antenna 711 and processing circuitry 720. Radio front end circuitry 712 can be coupled to or a part of antenna 711. In some embodiments, WD 710 may not include separate radio front end circuitry 712; rather, processing circuitry 720 can comprise radio front end circuitry and can be connected to antenna 711. Similarly, in some embodiments, some or all of RF transceiver circuitry 722 can be considered a part of interface 714. Radio front end circuitry 712 can receive digital data that is to be sent out to other network nodes or WDs via a wireless connection. Radio front end circuitry 712 can convert the digital data into a radio signal having the appropriate channel and bandwidth parameters using a combination of filters 718 and/or amplifiers 716. The radio signal can then be transmitted via antenna 711. Similarly, when receiving data, antenna 711 can collect radio signals which are then converted into digital data by radio front end circuitry 712. The digital data can be passed to processing circuitry 720. In other embodiments, the interface can comprise different components and/or different combinations of components.

Processing circuitry 720 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730, WD 710 functionality. Such functionality can include providing any of the various wireless features or benefits discussed herein. For example, processing circuitry 720 can execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry can comprise different components and/or different combinations of components. In certain embodiments processing circuitry 720 of WD 710 can comprise a SOC. In some embodiments, RF transceiver circuitry 722, baseband processing circuitry 724, and application processing circuitry 726 can be on separate chips or sets of chips. In alternative embodiments, part or all of baseband processing circuitry 724 and application processing circuitry 726 can be combined into one chip or set of chips, and RF transceiver circuitry 722 can be on a separate chip or set of chips. In still alternative embodiments, part or all of RF transceiver circuitry 722 and baseband processing circuitry 724 can be on the same chip or set of chips, and application processing circuitry 726 can be on a separate chip or set of chips. In yet other alternative embodiments, part or all of RF transceiver circuitry 722, baseband processing circuitry 724, and application processing circuitry 726 can be combined in the same chip or set of chips. In some embodiments, RF transceiver circuitry 722 can be a part of interface 714. RF transceiver circuitry 722 can condition RF signals for processing circuitry 720.

In certain embodiments, some or all of the functionality described herein as being performed by a WD can be provided by processing circuitry 720 executing instructions stored on device readable medium 730, which in certain embodiments can be a computer-readable storage medium. In alternative embodiments, some or all of the functionality can be provided by processing circuitry 720 without executing instructions stored on a separate or discrete device readable storage medium, such as in a hard-wired manner. In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 can be configured to perform any determining, calculating, or similar operations (e.g., certain obtaining operations) described herein as being performed by a WD. These operations, as performed by processing circuitry 720, can include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 can be operable to store a computer program, software, an application including one or more of logic, rules, code, tables, etc. and/or other instructions capable of being executed by processing circuitry 720. Device readable medium 730 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 720. In some embodiments, processing circuitry 720 and device readable medium 730 can be considered to be integrated.

User interface equipment 732 can include components that allow and/or facilitate a human user to interact with WD 710. Such interaction can be of many forms, such as visual, audial, tactile, etc. User interface equipment 732 can be operable to produce output to the user and to allow and/or facilitate the user to provide input to WD 710. The type of interaction can vary depending on the type of user interface equipment 732 installed in WD 710. For example, if WD 710 is a smart phone, the interaction can be via a touch screen; if WD 710 is a smart meter, the interaction can be through a screen that provides usage (e.g., the number of gallons used) or a speaker that provides an audible alert (e.g., if smoke is detected). User interface equipment 732 can include input interfaces, devices and circuits, and output interfaces, devices and circuits. User interface equipment 732 can be configured to allow and/or facilitate input of information into WD 710, and is connected to processing circuitry 720 to allow and/or facilitate processing circuitry 720 to process the input information. User interface equipment 732 can include, for example, a microphone, a proximity or other sensor, keys/buttons, a touch display, one or more cameras, a USB port, or other input circuitry. User interface equipment 732 is also configured to allow and/or facilitate output of information from WD 710, and to allow and/or facilitate processing circuitry 720 to output information from WD 710. User interface equipment 732 can include, for example, a speaker, a display, vibrating circuitry, a USB port, a headphone interface, or other output circuitry. Using one or more input and output interfaces, devices, and circuits, of user interface equipment 732, WD 710 can communicate with end users and/or the wireless network, and allow and/or facilitate them to benefit from the functionality described herein.

Auxiliary equipment 734 is operable to provide more specific functionality which may not be generally performed by WDs. This can comprise specialized sensors for doing measurements for various purposes, interfaces for additional types of communication such as wired communications etc. The inclusion and type of components of auxiliary equipment 734 can vary depending on the embodiment and/or scenario.

Power source 736 can, in some embodiments, be in the form of a battery or battery pack. Other types of power sources, such as an external power source (e.g., an electricity outlet), photovoltaic devices or power cells, can also be used. WD 710 can further comprise power circuitry 737 for delivering power from power source 736 to the various parts of WD 710 which need power from power source 736 to carry out any functionality described or indicated herein. Power circuitry 737 can in certain embodiments comprise power management circuitry. Power circuitry 737 can additionally or alternatively be operable to receive power from an external power source; in which case WD 710 can be connectable to the external power source (such as an electricity outlet) via input circuitry or an interface such as an electrical power cable. Power circuitry 737 can also in certain embodiments be operable to deliver power from an external power source to power source 736. This can be, for example, for the charging of power source 736. Power circuitry 737 can perform any converting or other modification to the power from power source 736 to make it suitable for supply to the respective components of WD 710.

Figure 8:
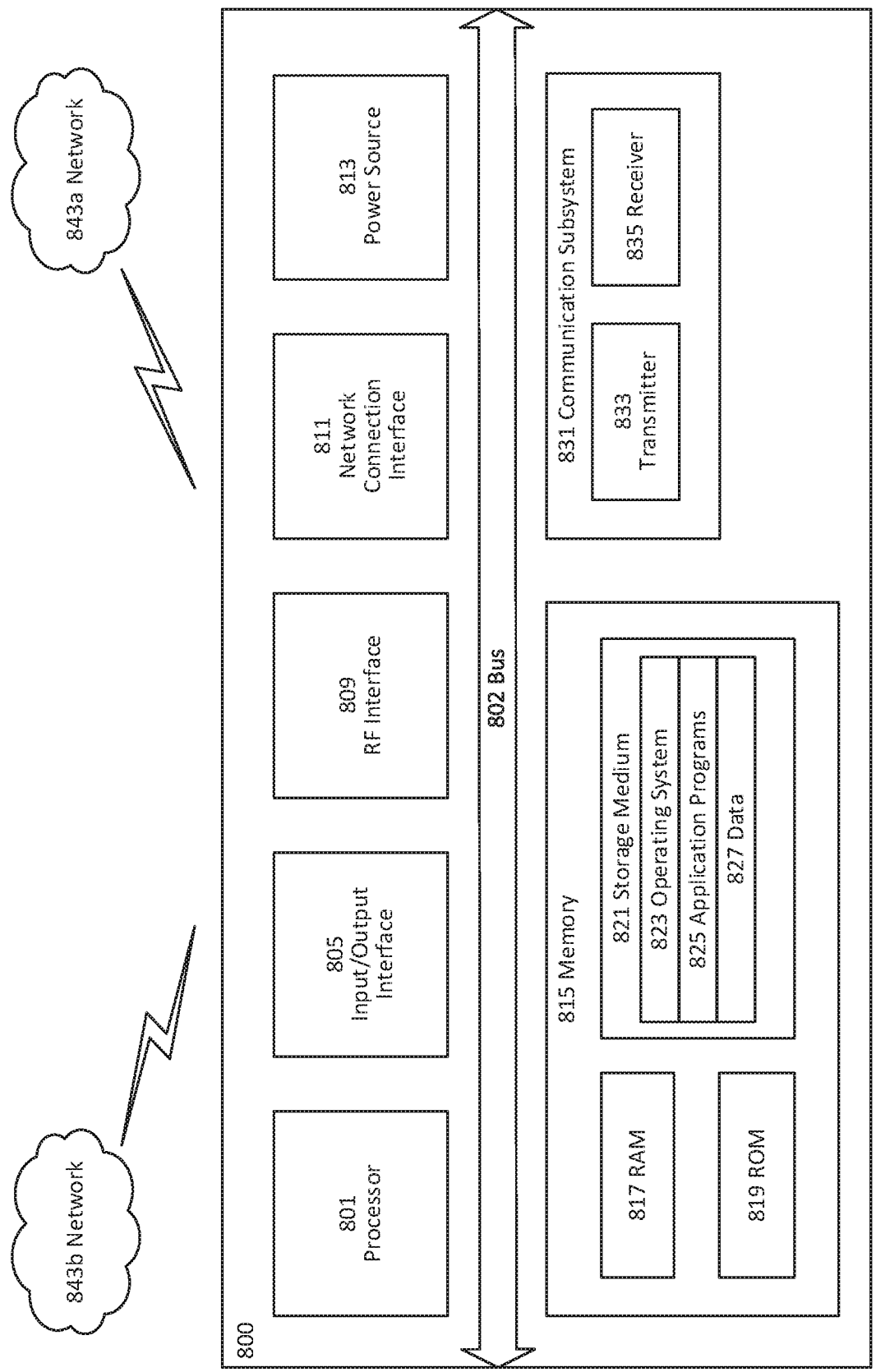
FIG. 8 is a block diagram of an exemplary user equipment (UE) configurable according to various exemplary embodiments of the present disclosure.

FIG. 8 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 8200 can be any UE identified by the $3^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 can include other similar types of information. Certain UEs can utilize all of the components shown in FIG. 8, or only a subset of the components. The level of integration between the components can vary from one UE to another UE. Further, certain UEs can contain multiple instances of a component, such as multiple processors, memories, transceivers, transmitters, receivers, etc.

In FIG. 8, processing circuitry 801 can be configured to process computer instructions and data. Processing circuitry 801 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 can include two central processing units (CPUs). Data can be information in a form suitable for use by a computer.

In the depicted embodiment, input/output interface 805 can be configured to provide a communication interface to an input device, output device, or input and output device. UE 800 can be configured to use an output device via input/output interface 805. An output device can use the same type of interface port as an input device. For example, a USB port can be used to provide input to and output from UE 800. The output device can be a speaker, a sound card, a video card, a display, a monitor, a printer, an actuator, an emitter, a smartcard, another output device, or any combination thereof. UE 800 can be configured to use an input device via input/output interface 805 to allow and/or facilitate a user to capture information into UE 800. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 8, RF interface 809 can be configured to provide a communication interface to RF components such as a transmitter, a receiver, and an antenna. Network connection interface 811 can be configured to provide a communication interface to network 843a. Network 843a can encompass wired and/or wireless networks such as a local-area network (LAN), a wide-area network (WAN), a computer network, a wireless network, a telecommunications network, another like network or any combination thereof. For example, network 843a can comprise a Wi-Fi network. Network connection interface 811 can be configured to include a receiver and a transmitter interface used to communicate with one or more other devices over a communication network according to one or more communication protocols, such as Ethernet, TCP/IP, SONET, ATM, or the like. Network connection interface 811 can implement receiver and transmitter functionality appropriate to the communication network links (e.g., optical, electrical, and the like). The transmitter and receiver functions can share circuit components, software or firmware, or alternatively can be implemented separately.

RAM 817 can be configured to interface via bus 802 to processing circuitry 801 to provide storage or caching of data or computer instructions during the execution of software programs such as the operating system, application programs, and device drivers. ROM 819 can be configured to provide computer instructions or data to processing circuitry 801. For example, ROM 819 can be configured to store invariant low-level system code or data for basic system functions such as basic input and output (I/O), startup, or reception of keystrokes from a keyboard that are stored in a non-volatile memory. Storage medium 821 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 can be configured to include operating system 823, application program 825 such as a web browser application, a widget or gadget engine or another application, and data file 827. Storage medium 821 can store, for use by UE 800, any of a variety of various operating systems or combinations of operating systems.

Storage medium 821 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 can allow and/or facilitate UE 800 to access computer-executable instructions, application programs or the like, stored on transitory or non-transitory memory media, to off-load data, or to upload data. An article of manufacture, such as one utilizing a communication system can be tangibly embodied in storage medium 821, which can comprise a device readable medium.

In FIG. 8, processing circuitry 801 can be configured to communicate with network 843b using communication subsystem 831. Network 843a and network 843b can be the same network or networks or different network or networks. Communication subsystem 831 can be configured to include one or more transceivers used to communicate with network 843b. For example, communication subsystem 831 can be configured to include one or more transceivers used to communicate with one or more remote transceivers of another device capable of wireless communication such as another WD, UE, or base station of a radio access network (RAN) according to one or more communication protocols, such as IEEE 802.8, CDMA, WCDMA, GSM, LTE, UTRAN, WiMax, or the like. Each transceiver can include transmitter 833 and/or receiver 835 to implement transmitter or receiver functionality, respectively, appropriate to the RAN links (e.g., frequency allocations and the like). Further, transmitter 833 and receiver 835 of each transceiver can share circuit components, software or firmware, or alternatively can be implemented separately.

In the illustrated embodiment, the communication functions of communication subsystem 831 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 can include cellular communication, Wi-Fi communication, Bluetooth communication, and GPS communication. Network 843b can encompass wired and/or wireless networks such as a local-area network (LAN), a wide-area network (WAN), a computer network, a wireless network, a telecommunications network, another like network or any combination thereof. For example, network 843b can be a cellular network, a Wi-Fi network, and/or a near-field network. Power source 813 can be configured to provide alternating current (AC) or direct current (DC) power to components of UE 800.

The features, benefits and/or functions described herein can be implemented in one of the components of UE 800 or partitioned across multiple components of UE 800. Further, the features, benefits, and/or functions described herein can be implemented in any combination of hardware, software or firmware. In one example, communication subsystem 831 can be configured to include any of the components described herein. Further, processing circuitry 801 can be configured to communicate with any of such components over bus 802. In another example, any of such components can be represented by program instructions stored in memory that when executed by processing circuitry 801 perform the corresponding functions described herein. In another example, the functionality of any of such components can be partitioned between processing circuitry 801 and communication subsystem 831. In another example, the non-computationally intensive functions of any of such components can be implemented in software or firmware and the computationally intensive functions can be implemented in hardware.

Figure 9:
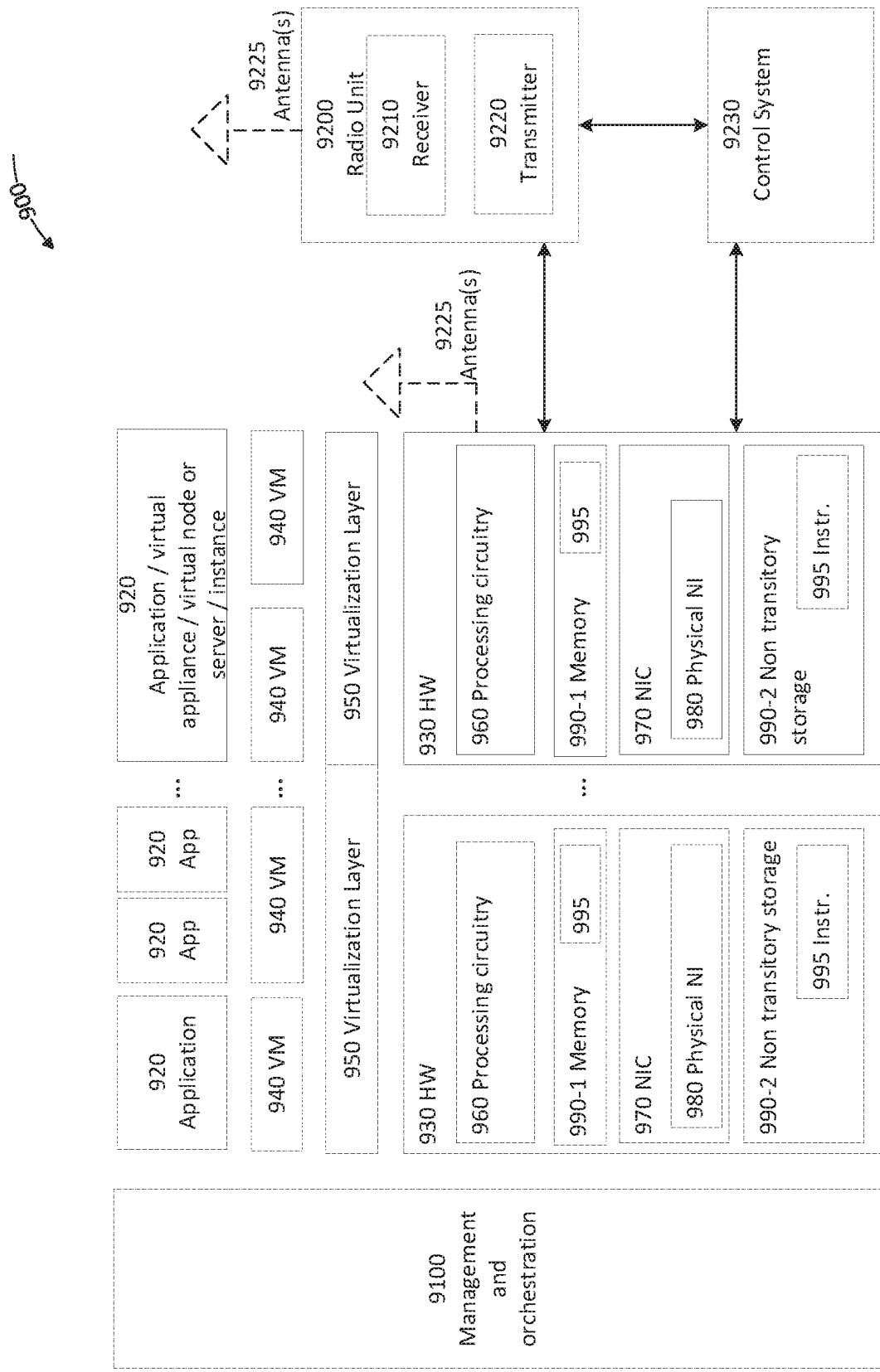
FIG. 9 is a block diagram of illustrating a virtualization environment that can facilitate virtualization of various functions implemented according to various exemplary embodiments of the present disclosure.

FIG. 9 is a schematic block diagram illustrating a virtualization environment 900 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node can be entirely virtualized.

The functions can be implemented by one or more applications 920 (which can alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which can be commercial off-the-shelf (COTS) processors, dedicated Application Specific Integrated Circuits (ASICs), or any other type of processing circuitry including digital or analog hardware components or special purpose processors. Each hardware device can comprise memory 990-1 which can be non-persistent memory for temporarily storing instructions 995 or software executed by processing circuitry 960. Each hardware device can comprise one or more network interface controllers (NICs) 970, also known as network interface cards, which include physical network interface 980. Each hardware device can also include non-transitory, persistent, machine-readable storage media 990-2 having stored therein software 995 and/or instructions executable by processing circuitry 960. Software 995 can include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and can be run by a corresponding virtualization layer 950 or hypervisor. Different embodiments of the instance of virtual appliance 920 can be implemented on one or more of virtual machines 940, and the implementations can be made in different ways.

During operation, processing circuitry 960 executes software 995 to instantiate the hypervisor or virtualization layer 950, which can sometimes be referred to as a virtual machine monitor (VMM). Virtualization layer 950 can present a virtual operating platform that appears like networking hardware to virtual machine 940.

As shown in FIG. 9, hardware 930 can be a standalone network node with generic or specific components. Hardware 930 can comprise antenna 9225 and can implement some functions via virtualization. Alternatively, hardware 930 can be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 940 can be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 can be coupled to one or more antennas 9225. Radio units 9200 can communicate directly with hardware nodes 930 via one or more appropriate network interfaces and can be used in combination with the virtual components to provide a virtual node with radio capabilities, such as a radio access node or a base station.

In some embodiments, some signalling can be effected with the use of control system 9230 which can alternatively be used for communication between the hardware nodes 930 and radio units 9200.

Figure 10:
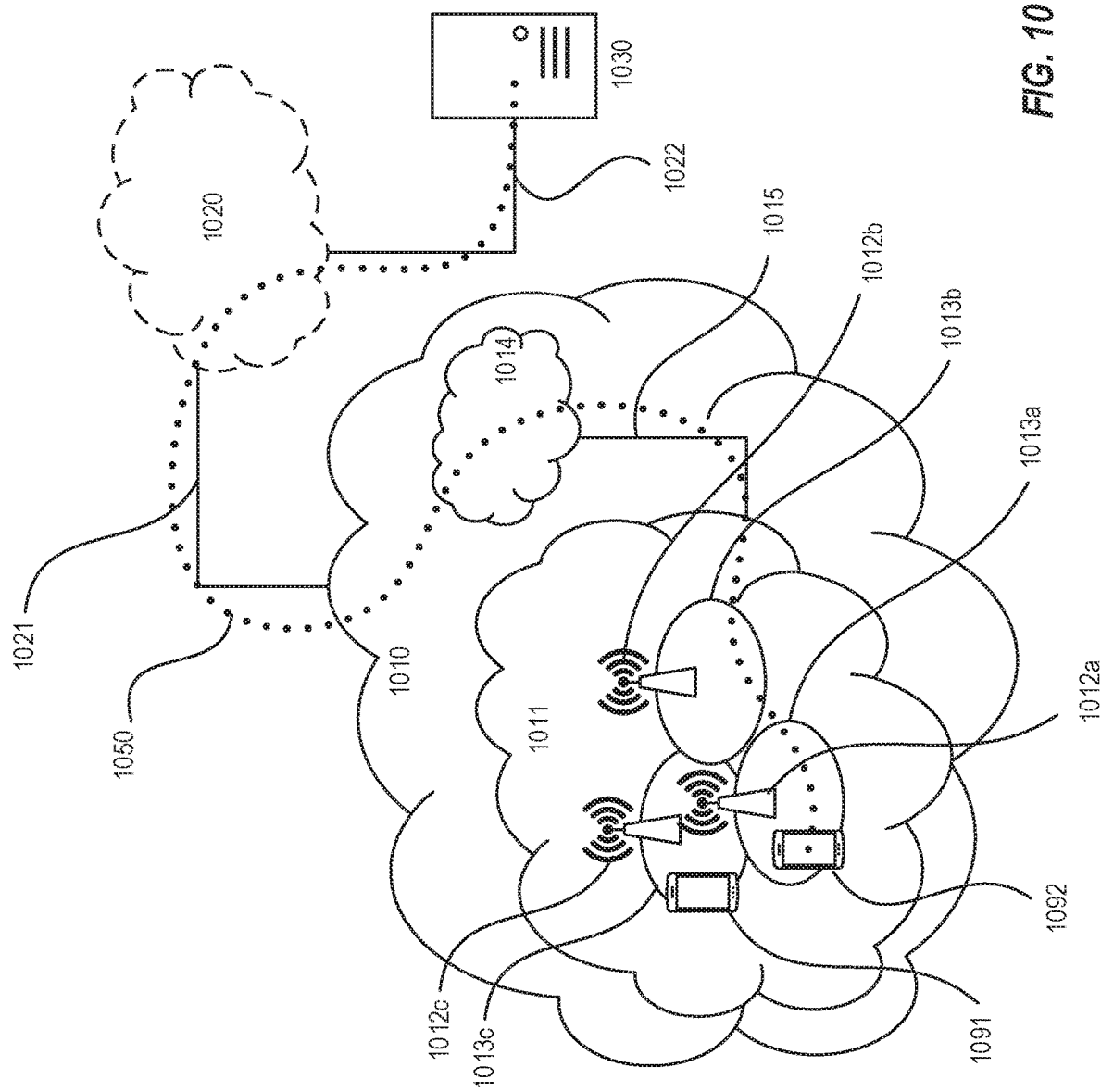
FIGS. 10-11 are block diagrams of exemplary communication systems configurable according to various exemplary embodiments of the present disclosure.

With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091 located in coverage area 1013c can be configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which can be embodied in the hardware and/or software of a standalone server, a cloud-implemented server, a distributed server or as processing resources in a server farm. Host computer 1030 can be under the ownership or control of a service provider, or can be operated by the service provider or on behalf of the service provider. Connections 1021 and 1022 between telecommunication network 1010 and host computer 1030 can extend directly from core network 1014 to host computer 1030 or can go via an optional intermediate network 1020. Intermediate network 1020 can be one of, or a combination of more than one of, a public, private or hosted network; intermediate network 1020, if any, can be a backbone network or the Internet; in particular, intermediate network 1020 can comprise two or more sub-networks (not shown).

The communication system of FIG. 10 as a whole enables connectivity between the connected UEs 1091, 1092 and host computer 1030. The connectivity can be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 can be transparent in the sense that the participating communication devices through which OTT connection 1050 passes are unaware of routing of uplink and downlink communications.

For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which can have storage and/or processing capabilities. In particular, processing circuitry 1118 can comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 can be operable to provide a service to a remote user, such as UE 1130 connecting via OTT connection 1150 terminating at UE 1130 and host computer 1110. In providing the service to the remote user, host application 1112 can provide user data which is transmitted using OTT connection 1150.

Communication system 1100 can also include base station 1120 provided in a telecommunication system and comprising hardware 1125 enabling it to communicate with host computer 1110 and with UE 1130. Hardware 1125 can include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 can be configured to facilitate connection 1160 to host computer 1110. Connection 1160 can be direct or it can pass through a core network (not shown in FIG. 11) of the telecommunication system and/or through one or more intermediate networks outside the telecommunication system. In the embodiment shown, hardware 1125 of base station 1120 can also include processing circuitry 1128, which can comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 can also include UE 1130 already referred to. Its hardware 1135 can include radio interface 1137 configured to set up and maintain wireless connection 1170 with a base station serving a coverage area in which UE 1130 is currently located. Hardware 1135 of UE 1130 can also include processing circuitry 1138, which can comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 can be operable to provide a service to a human or non-human user via UE 1130, with the support of host computer 1110. In host computer 1110, an executing host application 1112 can communicate with the executing client application 1132 via OTT connection 1150 terminating at UE 1130 and host computer 1110. In providing the service to the user, client application 1132 can receive request data from host application 1112 and provide user data in response to the request data. OTT connection 1150 can transfer both the request data and the user data. Client application 1132 can interact with the user to generate the user data that it provides.

Figure 11:
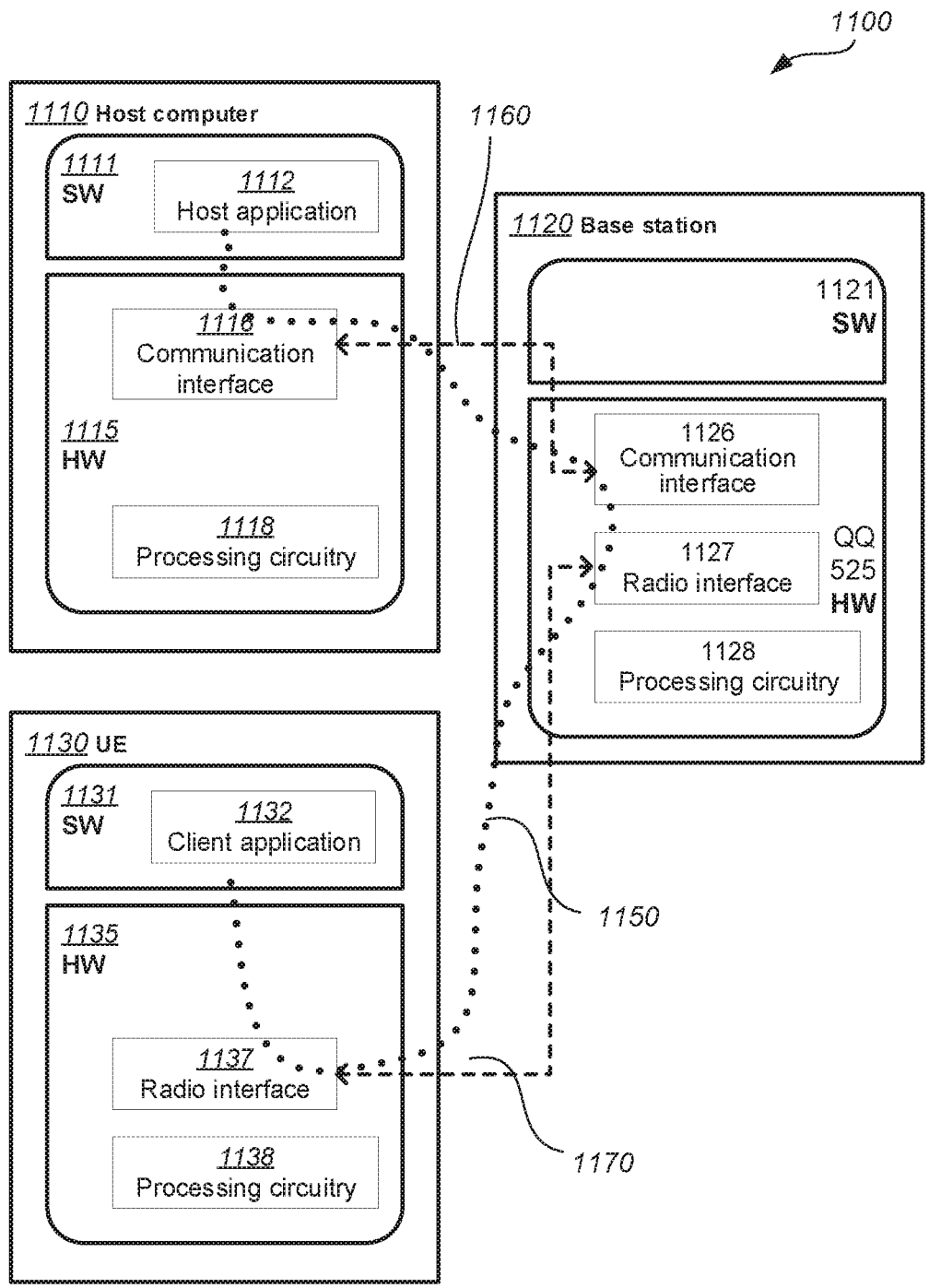

It is noted that host computer 1110, base station 1120 and UE 1130 illustrated in FIG. 11 can be similar or identical to host computer 1030, one of base stations 1012*a*, 1012*b*, 1012*c* and one of UEs 1091, 1092 of FIG. 10, respectively. This is to say, the inner workings of these entities can be as shown in FIG. 11 and independently, the surrounding network topology can be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure can determine the routing, which it can be configured to hide from UE 1130 or from the service provider operating host computer 1110, or both. While OTT connection 1150 is active, the network infrastructure can further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacitiy, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1150 between host computer 1110 and UE 1130, in response to variations in the measurement results. The measurement procedure and/or the network functionality for reconfiguring OTT connection 1150 can be implemented in software 1111 and hardware 1115 of host computer 1110 or in software 1131 and hardware 1135 of UE 1130, or both. In embodiments, sensors (not shown) can be deployed in or in association with communication devices through which OTT connection 1150 passes; the sensors can participate in the measurement procedure by supplying values of the monitored quantities exemplified above, or supplying values of other physical quantities from which software 1111, 1131 can compute or estimate the monitored quantities. The reconfiguring of OTT connection 1150 can include message format, retransmission settings, preferred routing etc.; the reconfiguring need not affect base station 1120, and it can be unknown or imperceptible to base station 1120. Such procedures and functionalities can be known and practiced in the art. In certain embodiments, measurements can involve proprietary UE signaling facilitating host computer 1110's measurements of throughput, propagation times, latency and the like. The measurements can be implemented in that software 1111 and 1131 causes messages to be transmitted, in particular empty or 'dummy' messages, using OTT connection 1150 while it monitors propagation times, errors etc.

FIG. 12 is a flowchart illustrating an exemplary method and/or procedure implemented in a communication system, in accordance with one embodiment. The communication system includes a host computer, a base station and a UE which, in some exemplary embodiments, can be those described with reference to FIGS. 10 and 11. For simplicity of the present disclosure, only drawing references to FIG. 12 will be included in this section. In step 1210, the host computer provides user data. In substep 1211 (which can be optional) of step 1210, the host computer provides the user data by executing a host application. In step 1220, the host computer initiates a transmission carrying the user data to the UE. In step 1230 (which can be optional), the base station transmits to the UE the user data which was carried in the transmission that the host computer initiated, in accordance with the teachings of the embodiments described throughout this disclosure. In step 1240 (which can also be optional), the UE executes a client application associated with the host application executed by the host computer.

FIG. 13 is a flowchart illustrating an exemplary method and/or procedure implemented in a communication system, in accordance with one embodiment. The communication system includes a host computer, a base station and a UE which can be those described with reference to FIGS. 10 and 11. For simplicity of the present disclosure, only drawing references to FIG. 13 will be included in this section. In step 1310 of the method, the host computer provides user data. In an optional sub step (not shown) the host computer provides the user data by executing a host application. In step 1320, the host computer initiates a transmission carrying the user data to the UE. The transmission can pass via the base station, in accordance with the teachings of the embodiments described throughout this disclosure. In step 1330 (which can be optional), the UE receives the user data carried in the transmission.

Figures 14, 15:
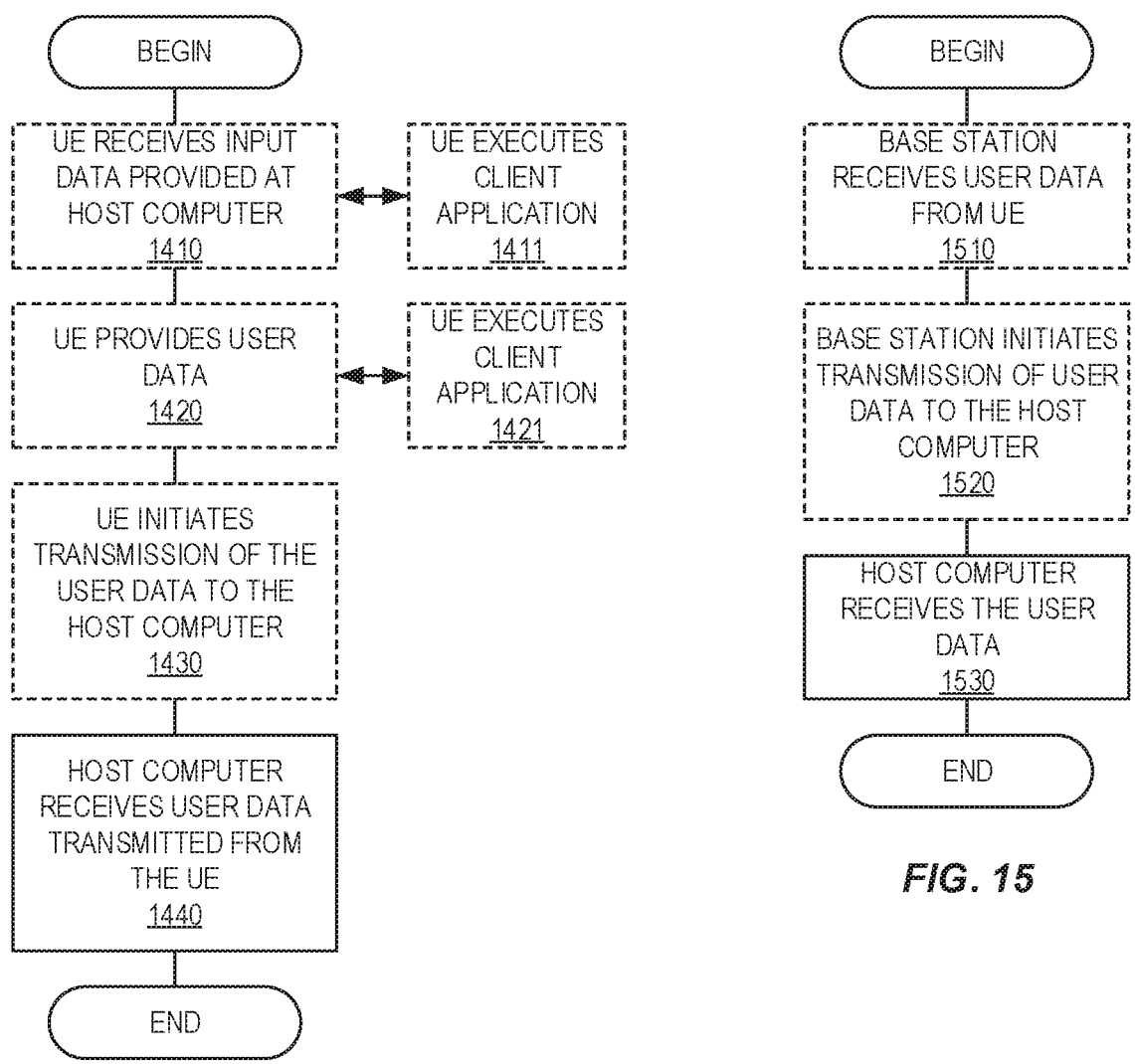

FIG. 14 is a flowchart illustrating an exemplary method and/or procedure implemented in a communication system, in accordance with one embodiment. The communication system includes a host computer, a base station and a UE which can be those described with reference to FIGS. 10 and 11. For simplicity of the present disclosure, only drawing references to FIG. 14 will be included in this section. In step 1410 (which can be optional), the UE receives input data provided by the host computer. Additionally or alternatively, in step 1420, the UE provides user data. In substep 1421 (which can be optional) of step 1420, the UE provides the user data by executing a client application. In substep 1411 (which can be optional) of step 1410, the UE executes a client application which provides the user data in reaction to the received input data provided by the host computer. In providing the user data, the executed client application can further consider user input received from the user. Regardless of the specific manner in which the user data was provided, the UE initiates, in substep 1430 (which can be optional), transmission of the user data to the host computer.

In step 1440 of the method, the host computer receives the user data transmitted from the UE, in accordance with the teachings of the embodiments described throughout this disclosure.

FIG. 15 is a flowchart illustrating an exemplary method and/or procedure implemented in a communication system, in accordance with one embodiment. The communication system includes a host computer, a base station and a UE which can be those described with reference to FIGS. 10 and 11. For simplicity of the present disclosure, only drawing references to FIG. 15 will be included in this section. In step 1510 (which can be optional), in accordance with the teachings of the embodiments described throughout this disclosure, the base station receives user data from the UE. In step 1520 (which can be optional), the base station initiates transmission of the received user data to the host computer. In step 1530 (which can be optional), the host computer receives the user data carried in the transmission initiated by the base station.

The term unit can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Exemplary embodiments of the present disclosure include the following enumerated embodiments.

1. A method for reducing Packet Data Convergence Protocol (PDCP) processing performed in a node of a multi-hop, integrated access backhaul (IAB) communication network, the method comprising:
    receiving a configuration that identifies at least one characteristic associated with at least one of a data packet and the node, and whether the node should enable or disable a first PDCP processing operation based on the at least one characteristic;
    receiving a further data packet associated with one or more characteristics;
    determining if the one or more characteristics associated with the further data packet matches the at least one characteristic;
    enabling the first PDCP processing operation on the further data packet if the one or more characteristics matches the at least one characteristic; and
    disabling the first PDCP processing operation if the one or more characteristics do not match the at least one characteristic.
2. The method of embodiment 1, wherein the first PDCP processing operation comprises at least one of: encryption/decryption and integrity protection of PDCP messages.
3. The method of embodiment 2, wherein the first PDCP processing operation comprises both encryption/decryption and integrity protection, and wherein the each of the encryption/decryption and the integrity protection operations can be enabled or disabled independently of the other operation.
4. The method of embodiments 1-2, wherein disabling the first PDCP processing operation comprises performing at least one of a null ciphering algorithm and a null integrity protection algorithm.
5. The method of embodiments 1-4, wherein the at least one characteristic comprises at least one protocol.
6. The method of embodiment 1-5, further comprising:
    the at least one protocol comprises Stream Control Transmission Protocol (SCTP) and GPRS Tunneling Protocol (GTP);
    the first PDCP processing operation is enabled if a protocol associated with the further data packet is SCTP; and
    if the protocol associated with the further data packet is GTP, enabling or disabling the first PDCP processing operation based on a second characteristic comprising the at least one characteristics.
7. The method of embodiments 1-6, wherein:
    the at least one characteristic comprises a hop count threshold;
    the first PDCP processing operation is enabled if the node's hop count in the multi-hop IAB network is less than the hop count threshold; and
    the first PDCP processing operation is disabled if the node's hop count in the multi-hop IAB network is greater than or equal to the hop count threshold.
8. The method of embodiments 1-7, wherein:
    the at least one characteristic comprises the identity of one or more radio bearers;
    the first PDCP processing operation is enabled if a radio bearer associated with the further data packet matches the identity of at least one of the one or more radio bearers; and
    the first PDCP processing operation is disabled if a radio bearer associated with the further data packet does not match the identity of at least one of the one or more radio bearers.
9. The method of embodiments 1-8, wherein:
    the at least one characteristic comprises identification of first and second partitions of a GPRS Tunneling Protocol (GTP) Tunnel ID (TEID) space;
    the first PDCP processing operation is enabled if a GPRS TEID associated with the further data packet matches the first partition; and
    the first PDCP processing operation is disabled if the GPRS TEID associated with the further data packet matches the second partition.
10. The method of embodiments 1-9, wherein the node comprises a central unit (CU) of a Next-Generation Radio Access Network (NG-RAN).
11. The method of embodiments 1-10, wherein determining if the one or more characteristics associated with the further data packet matches the at least one characteristic comprises inspecting one or more headers comprising the further data packet.
12. A first network node comprising:
    processing circuitry configured to perform operations corresponding to any of the methods of embodiments 1-11; and
    power supply circuitry configured to supply power to the first network node.
13. A communication system including a host computer comprising:
    processing circuitry configured to provide user data; and
    a communication interface configured to forward the user data to a cellular network for transmission to a user equipment (UE),
    wherein the cellular network comprises a first network node having a radio interface and processing circuitry; and the first network node's processing circuitry is configured to perform operations corresponding to any of the methods of embodiments 1-11.

14. The communication system of embodiment 13, further including a user equipment configured to communicate with at least one of the first and second network nodes.

15. The communication system of any of embodiments 13-14, wherein:
the processing circuitry of the host computer is configured to execute a host application, thereby providing the user data; and
the UE comprises processing circuitry configured to execute a client application associated with the host application.

16. The communication system of any of embodiments 13-15, further comprising a plurality of further network nodes arranged in a multi-hop integrated access backhaul (IAB) configuration, and configured to communicate with the UE via the first network node.

17. A method implemented in a communication system including a host computer, first network node, and a user equipment (UE), the method comprising:
at the host computer, providing user data;
at the host computer, initiating a transmission carrying the user data to the UE via a cellular network comprising the first network node; and
operations, performed by a first network node, corresponding to any of the methods of embodiments 1-11.

18. The method of embodiment 17, further comprising, transmitting the user data by the first second network nodes.

19. The method of any of embodiments 17-18, wherein the user data is provided at the host computer by executing a host application, the method further comprising, at the UE, executing a client application associated with the host application.

20. The method of any of embodiments 17-19, further comprising operations, performed by a second network node arranged in a multi-hop integrated access backhaul (IAB) configuration with the first network node, corresponding to any of the methods of embodiments 1-11.

21. A communication system including a host computer comprising a communication interface configured to receive user data originating from a transmission from a user equipment (UE) to a first network node comprising a radio interface and processing circuitry configured to perform operations corresponding to any of the methods of embodiments 1-11.

22. The communication system of embodiment 21, further including the first network node.

23. The communication system of embodiments 21-22, further including a second network node arranged in a multi-hop integrated access backhaul (IAB) configuration with the first network node, and comprising radio interface circuitry and processing circuitry configured to perform operations corresponding to any of the methods of embodiments 1-11.

24. The communication system of any of embodiments 21-23, further including the UE, wherein the UE is configured to communicate with at least one of the first and second network nodes.

25. The communication system of any of embodiments 21-24, wherein:
a. the processing circuitry of the host computer is configured to execute a host application;
b. the UE is configured to execute a client application associated with the host application, thereby providing the user data to be received by the host computer.

What is claimed is:

1. A method for Packet Data Convergence Protocol (PDCP) processing performed in a network node of a multi-hop, integrated access backhaul (IAB) communication network, the network node being an IAB node, the method comprising:
receiving a configuration that includes a first characteristic associated with at least one of the following: the network node, and data packets received by the network node, the configuration comprising an indication of whether to enable or to disable a first PDCP processing operation based on the first characteristic;
receiving a data packet having one or more packet characteristics;
determining if there is a match between the one or more packet characteristics and the first characteristic, the determination being at least partially based on a quality of service (QoS) requirement; and
enabling or disabling a first PDCP processing operation on the data packet based on the result of the determination and the received indication,
the first PDCP processing operation comprises at least one of the following:
encryption, integrity protection, and integrity verification of PDCP messages;
the first characteristic comprises a hop count threshold;
the one or more packet characteristics comprise the number of hops the data packet has traversed in the IAB network;
the first PDCP processing operation is enabled if the number of hops is less than the hop count threshold; and
the first PDCP processing operation is disabled if the number of hops is greater than or equal to the hop count threshold.

2. The method of claim 1, wherein enabling or disabling the first PDCP processing operation comprises:
enabling the first PDCP processing operation on the data packet if the one or more packet characteristics match the first characteristic; and
disabling the first PDCP processing operation if the one or more packet characteristics do not match the first characteristic.

3. The method of claim 2, wherein disabling the first PDCP processing operation comprises performing at least one of the following: a null ciphering algorithm and a null integrity protection algorithm.

4. The method of claim 1, wherein the first PDCP processing operation further comprises decryption.

5. The method of claim 1, wherein:
the first PDCP processing operation comprises one of the following pairs of operations: encryption and integrity protection; and
decryption and integrity verification;
enabling or disabling of the first PDCP processing operation comprises enabling or disabling one operation of the pair independently of the other operation of the pair.

6. The method of claim 1, wherein:
the first characteristic comprises a first data transmission protocol;
the one or more packet characteristics comprise one or more protocols used to transmit the data packet; and
the first PDCP processing operation is enabled if the one or more protocols include the first data transmission protocol.

7. The method of claim 6, wherein the first data transmission protocol is associated with control-plane (CP) traffic in the IAB network but not associated with user-plane (UP) traffic in the IAB network.

8. The method of claim 6, wherein:
the first characteristic further includes a second data transmission protocol;
the received configuration further comprises a second characteristic associated with at least one of the following:
the node and data packets received by the node; and
enabling or disabling the first PDCP processing is based on:
whether the one or more protocols used to transmit the data packet include the second protocol; and
whether the one or more packet characteristics match the second characteristic.

9. The method of claim 8, wherein:
the first data transmission protocol is Stream Control Transmission Protocol (SCTP); the second data transmission protocol is General Packet Radio Service (GPRS) Tunneling Protocol (GTP); and
the second characteristic is a GTP packet type.

10. The method of claim 1, wherein:
the first characteristic comprises identities of one or more radio bearers used to carry data packets;
the one or more packet characteristics include a radio bearer used to transmit the data packet;
the first PDCP processing operation is enabled if the identities of the one or more radio bearers include the radio bearer used to transmit the data packet; and
the first PDCP processing operation is disabled if the identities of the one or more radio bearers do not include the radio bearer used to transmit the data packet.

11. The method of claim 1, wherein:
the first characteristic comprises identification of first and second partitions of a General Packet Radio Service (GPRS) Tunneling Protocol Tunnel Endpoint ID (GTP TEID) space;
the one or more packet characteristics include a GTP TEID associated with the data packet;
the first PDCP processing operation is enabled if the GTP TEID associated with the data packet is included in the first partition; and
the first PDCP processing operation is disabled if the GTP TEID associated with the data packet is included in the second partition.

12. The method of claim 1, wherein:
the first characteristic comprises a plurality of addresses associated with one or more user equipment (UEs) served by the IAB network;
the one or more packet characteristics include an address included in a header of the data packet;
the first PDCP processing operation is enabled if the address is included in the plurality of addresses; and
the first PDCP processing operation is disabled if the address is not included in the plurality of addresses.

13. The method of claim 1, wherein determining if there is a match between the one or more characteristics and the first characteristic comprises inspecting one or more headers comprising the data packet.

14. The method of claim 1, wherein one of the following applies:
the data packet is a downlink (DL) data packet, and the method is performed by a base station central unit (gNB-CU); and
the data packet is an uplink (UL) data packet, and the method is performed by the IAB node.

15. A network node arranged to perform Packet Data Convergence Protocol (PDCP) processing in a multi-hop, integrated access backhaul (IAB) communication network, the network node being an IAB node and comprising:
power supply circuitry configured to supply power to the network node;
processing circuitry; and
one or more device-readable media containing computer-executable instructions that, when executed by the processing circuitry, configure the network node to:
receive a configuration that includes a first characteristic associated with at least one of the following: the network node, and data packets received by the network node, the configuration comprising an indication of whether to enable or to disable a first PDCP processing operation based on the first characteristic;
receive a data packet having one or more packet characteristics;
determine if there is a match between the one or more packet characteristics and the first characteristic, the determination being at least partially based on a quality of service (QoS) requirement;
enable or disable a first PDCP processing operation on the data packet based on the result of the determination and the received indication;
the first PDCP processing operation comprises at least one of the following:
encryption, integrity protection, and integrity verification of PDCP messages;
the first characteristic comprises a hop count threshold;
the one or more packet characteristics comprise the number of hops the data packet has traversed in the IAB network;
the first PDCP processing operation is enabled if the number of hops is less than the hop count threshold; and
the first PDCP processing operation is disabled if the number of hops is greater than or equal to the hop count threshold.

16. The network node of claim 15, wherein the processing circuitry further comprises transceiver circuitry configured to communicate with one or more further network nodes in the IAB network.

17. The network node of claim 15, wherein execution of the instructions configures the network node to enable or disable the first PDCP processing operation by:
enabling the first PDCP processing operation on the data packet if the one or more packet characteristics match the first characteristic; and
disabling the first PDCP processing operation if the one or more packet characteristics do not match the first characteristic.

18. The network node of claim 17, wherein execution of the instructions further configures the network node to disable the first PDCP processing operation based on performing at least one of the following: a null ciphering algorithm and a null integrity protection algorithm.

19. The network node of claim 15, wherein the first PDCP processing operation further comprises decryption.

20. The network node of claim 15, wherein:
the first PDCP processing operation comprises one of the following pairs of operations:
encryption and integrity protection; and
decryption and integrity verification; and
execution of the instructions further configures the network node to enable or disable the first PDCP processing operation based on enabling or disabling one operation of the pair independently of the other operation of the pair.

21. The network node of claim 15, wherein:
the first characteristic comprises a first data transmission protocol;
the one or more packet characteristics comprise one or more protocols used to transmit the data packet; and
the first PDCP processing operation is enabled if the one or more protocols include the first data transmission protocol.

22. The network node of claim 21, wherein the first data transmission protocol is associated with control-plane (CP) traffic in the IAB network but not associated with user-plane (UP) traffic in the IAB network.

23. The network node of claim 21, wherein:
the first characteristic further includes a second data transmission protocol;
the received configuration further comprises a second characteristic associated with at least one of the following: the node and data packets received by the node; and
execution of the instructions configures the network node to enable or disable the first PDCP processing based on:
whether the one or more protocols used to transmit the data packet include the second protocol; and
whether the one or more packet characteristics match the second characteristic.

24. The network node of claim 23, wherein:
the first data transmission protocol is Stream Control Transmission Protocol (SCTP); the second data transmission protocol is General Packet Radio Service (GPRS) Tunneling Protocol (GTP); and the second characteristic is a GTP packet type.

25. The network node of claim 15, wherein:
the first characteristic comprises identities of one or more radio bearers used to carry data packets;
the one or more packet characteristics include a radio bearer used to transmit the data packet;
the first PDCP processing operation is enabled if the identities of the one or more radio bearers includes the radio bearer used to transmit the data packet; and
the first PDCP processing operation is disabled if the identities of the one or more radio bearers do not include the radio bearer used to transmit the data packet.

26. The network node of claim 15, wherein:
the first characteristic comprises identification of first and second partitions of a General Packet Radio Service (GPRS) Tunneling Protocol Tunnel Endpoint ID (GTP TEID) space;
the one or more packet characteristics include a GTP TEID associated with the data packet;

the first PDCP processing operation is enabled if the GTP TEID associated with the data packet is included in the first partition; and
the first PDCP processing operation is disabled if the GTP TEID associated with the data packet is included in the second partition.

27. The network node of claim 15, wherein:
the first characteristic comprises a plurality of addresses associated with one or more user equipment (UEs) served by the IAB network;
the one or more packet characteristics include an address included in a header of the data packet;
the first PDCP processing operation is enabled if the address is included in the plurality of addresses; and
the first PDCP processing operation is disabled if the address is not included in the plurality of addresses.

28. The network node of claim 15, wherein execution of the instructions further configures the network node to determine if there is a match between the one or more characteristics and the first characteristic based on inspecting one or more headers comprising the data packet.

29. The network node of claim 15, wherein one of the following applies:
the data packet is a downlink (DL) data packet, and the network node is a base station central unit (gNB-CU); and
the data packet is an uplink (UL) data packet, and the network node is the IAB node.

30. A non-transitory, computer-readable medium storing computer-executable instructions that, when executed by processing circuitry comprising an integrated access backhaul network node of a multi-hop integrated access backhaul (IAB) network, configure the network node to perform a method for Packet Data Convergence Protocol (PDCP) processing, the method comprising:
receiving a configuration that includes a first characteristic associated with at least one of the following: the network node, and data packets received by the network node, the configuration comprising an indication of whether to enable or to disable a first PDCP processing operation based on the first characteristic;
receiving a data packet having one or more packet characteristics;
determining if there is a match between the one or more packet characteristics and the first characteristic, the determination being at least partially based on a quality of service (QoS) requirement; and
enabling or disabling a first PDCP processing operation on the data packet based on the result of the determination and the received indication,
the first PDCP processing operation comprises at least one of the following:
encryption, integrity protection, and integrity verification of PDCP messages;
the first characteristic comprises a hop count threshold;
the one or more packet characteristics comprise the number of hops the data packet has traversed in the IAB network;
the first PDCP processing operation is enabled if the number of hops is less than the hop count threshold; and
the first PDCP processing operation is disabled if the number of hops is greater than or equal to the hop count threshold.

* * * * *